(12) United States Patent
Kaiser

(10) Patent No.: US 10,795,245 B1
(45) Date of Patent: Oct. 6, 2020

(54) SELFIE APPARATUS

(71) Applicant: Erik A. Kaiser, New York, NY (US)

(72) Inventor: Erik A. Kaiser, New York, NY (US)

( * ) Notice: Subject to any disclaimer, the term of this patent is extended or adjusted under 35 U.S.C. 154(b) by 0 days.

(21) Appl. No.: 16/935,728

(22) Filed: Jul. 22, 2020

Related U.S. Application Data

(63) Continuation of application No. 16/700,343, filed on Dec. 2, 2019, now Pat. No. 10,754,230, which is a continuation of application No. 16/111,324, filed on Aug. 24, 2018, now Pat. No. 10,495,950, which is a continuation of application No. 15/480,664, filed on Apr. 6, 2017, now abandoned, which is a continuation (Continued)

(51) Int. Cl.

| | |
|---|---|
| *G03B 17/56* | (2006.01) |
| *H04N 5/232* | (2006.01) |
| *G03B 15/06* | (2006.01) |
| *G03B 17/38* | (2006.01) |
| *G03B 15/05* | (2006.01) |
| *H04N 5/225* | (2006.01) |
| *G03B 15/03* | (2006.01) |
| *H04W 4/80* | (2018.01) |
| *F16B 2/12* | (2006.01) |
| *F16M 13/02* | (2006.01) |
| *F16M 11/32* | (2006.01) |

(52) U.S. Cl.
CPC .............. *G03B 17/561* (2013.01); *F16B 2/12* (2013.01); *F16M 13/02* (2013.01); *G03B 15/03* (2013.01); *G03B 15/05* (2013.01); *G03B 15/06* (2013.01); *G03B 17/38* (2013.01); *H04N 5/2252* (2013.01); *H04N 5/2256* (2013.01); *H04N 5/23203* (2013.01); *H04W 4/80* (2018.02); *F16M 11/32* (2013.01); *F16M 2200/068* (2013.01); *F16M 2200/08* (2013.01)

(58) Field of Classification Search
CPC ...... G03B 17/561; G03B 15/03; G03B 15/05; G03B 15/06
See application file for complete search history.

(56) References Cited

U.S. PATENT DOCUMENTS

| | | | | |
|---|---|---|---|---|
| 3,200,786 A | * | 8/1965 | Swezy | ..................... E01F 9/688 |
| | | | | 116/63 P |
| 9,648,217 B2 | * | 5/2017 | Kaiser | ..................... H04W 4/80 |

(Continued)

*Primary Examiner* — Clayton E. LaBalle
*Assistant Examiner* — Dennis Hancock
(74) *Attorney, Agent, or Firm* — Steven N. Fox, Esq.

(57) ABSTRACT

Apparatus for use with a communication device having a camera to take a selfie picture. The apparatus comprises a tri-pod stand comprising an upper pole. The apparatus further comprises a control unit engaged with the upper pole. The apparatus further comprises first, second, and third flexible arms extending upward from the control unit. The apparatus further comprises first and second light sources engaged with the first and second flexible arms, respectively. The apparatus further comprises a fastener engaged with the third flexible arm to engage the communication device. The control unit being adapted to send a first signal to the communication device to activate the light sources and a second signal to activate the camera of the communication device. The apparatus further comprises a remote control to send a signal to the control unit to send a signal to the communication device to activate the camera and take a picture.

8 Claims, 22 Drawing Sheets

Related U.S. Application Data of application No. 14/678,996, filed on Apr. 5, 2015, now Pat. No. 9,648,217.

(60) Provisional application No. 62/136,462, filed on Mar. 21, 2015.

(56) References Cited

U.S. PATENT DOCUMENTS

| | | | | |
|---|---|---|---|---|
| 2006/0077286 A1* | 4/2006 | Wenderski | ........... | G03B 17/561 348/373 |
| 2015/0358044 A1* | 12/2015 | Barstead | .............. | H04B 1/3888 455/575.1 |
| 2020/0142282 A1* | 5/2020 | Kaiser | .................. | G03B 17/561 |

* cited by examiner

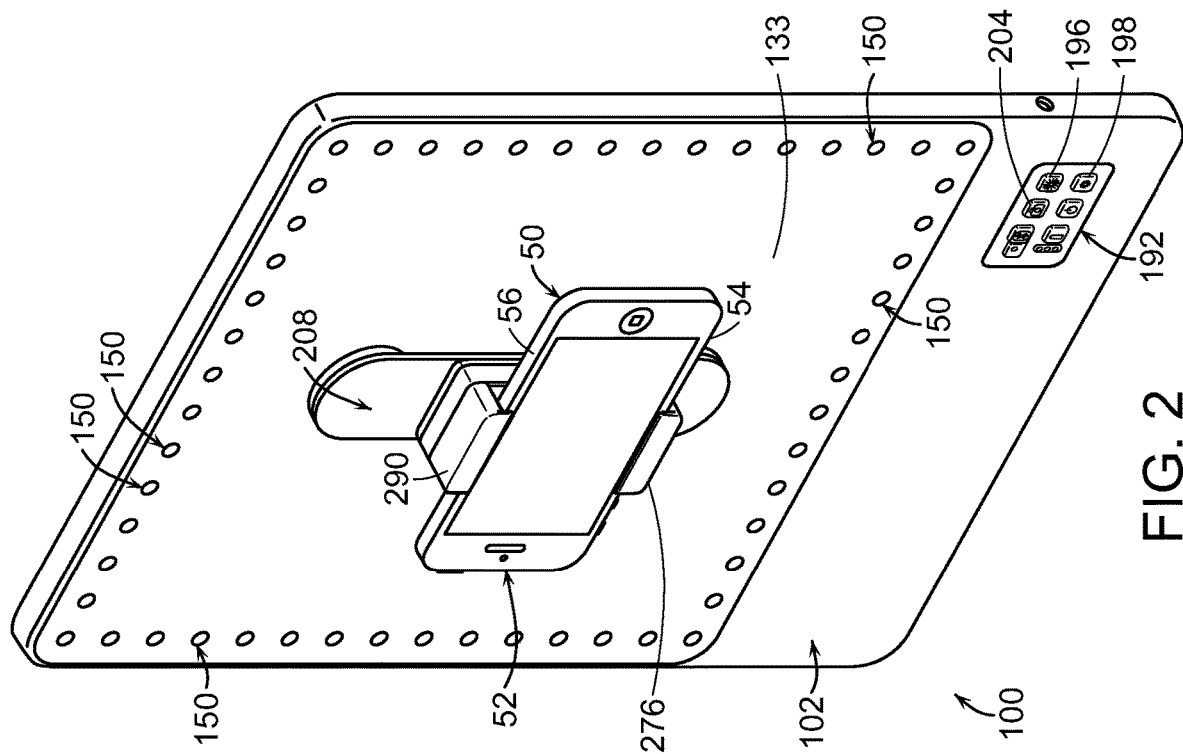
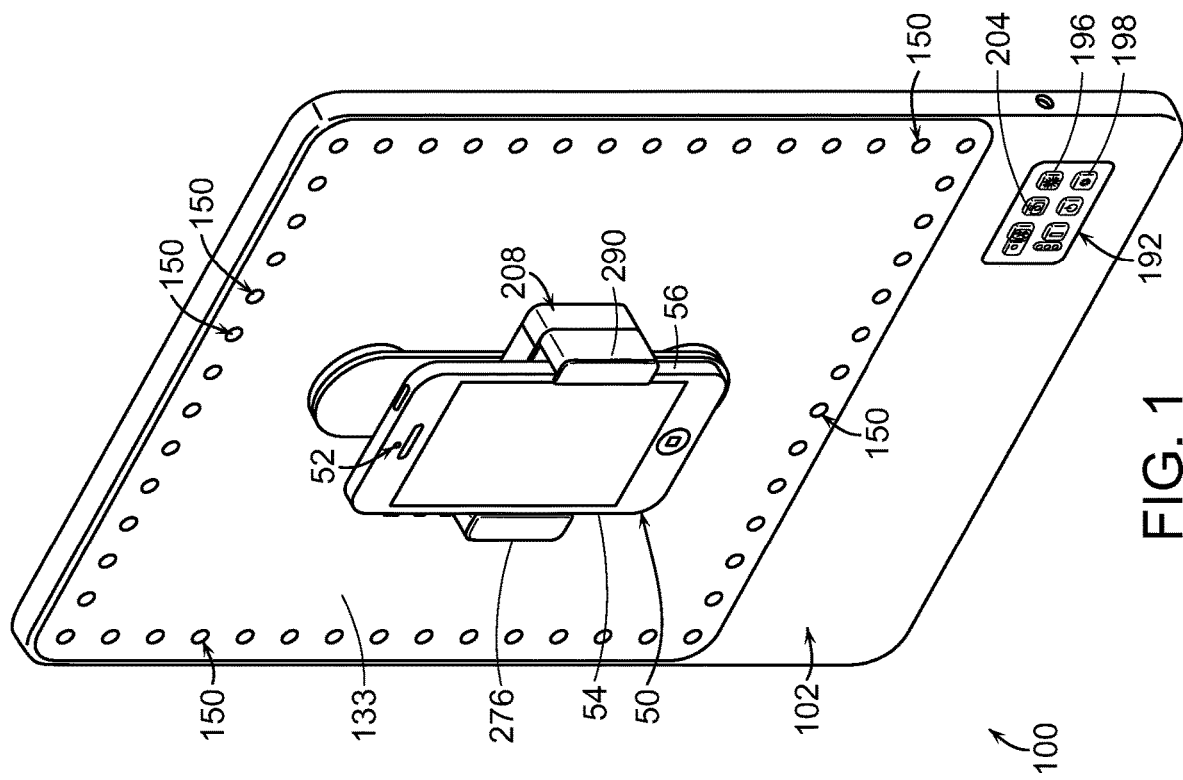

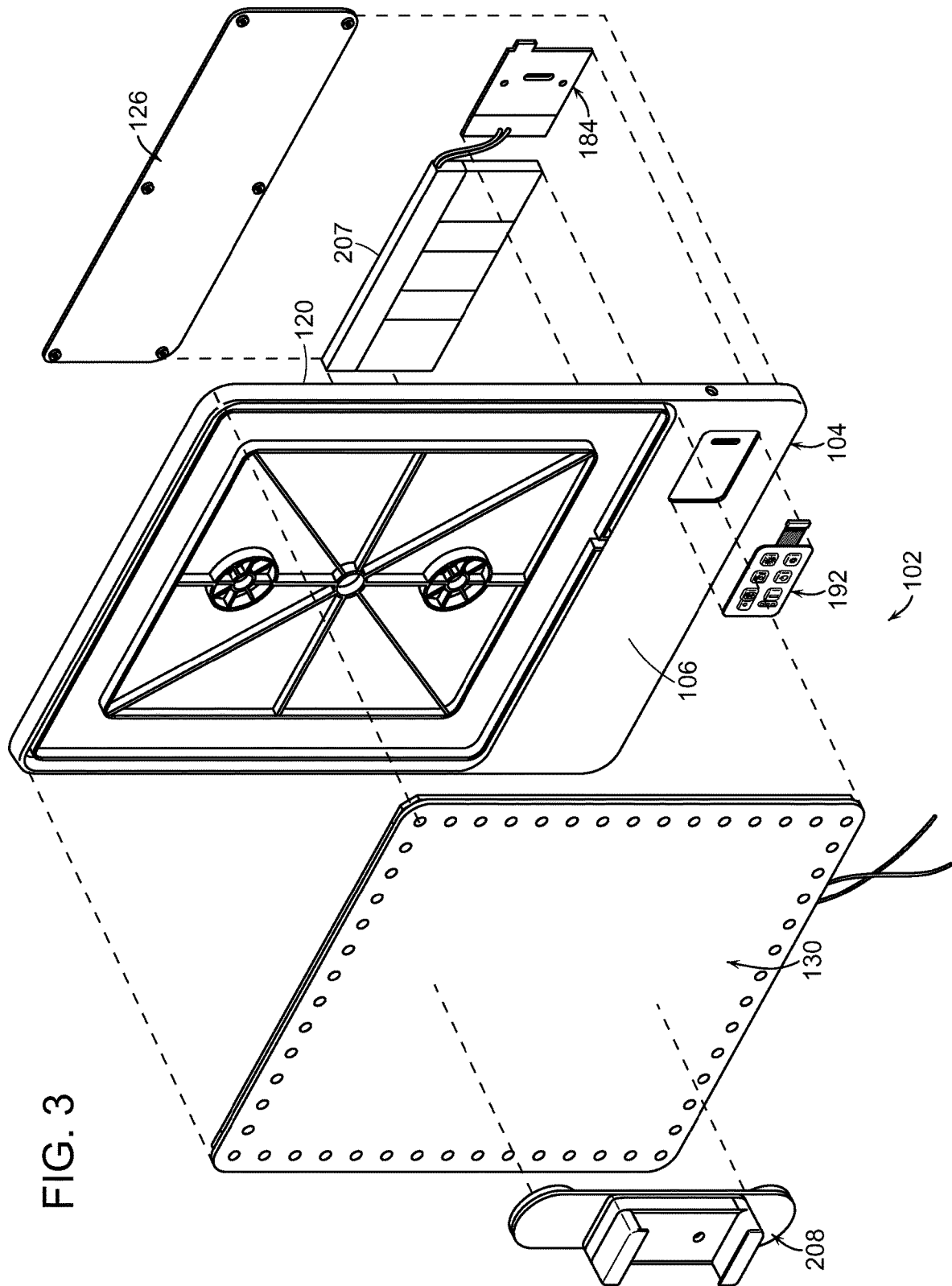

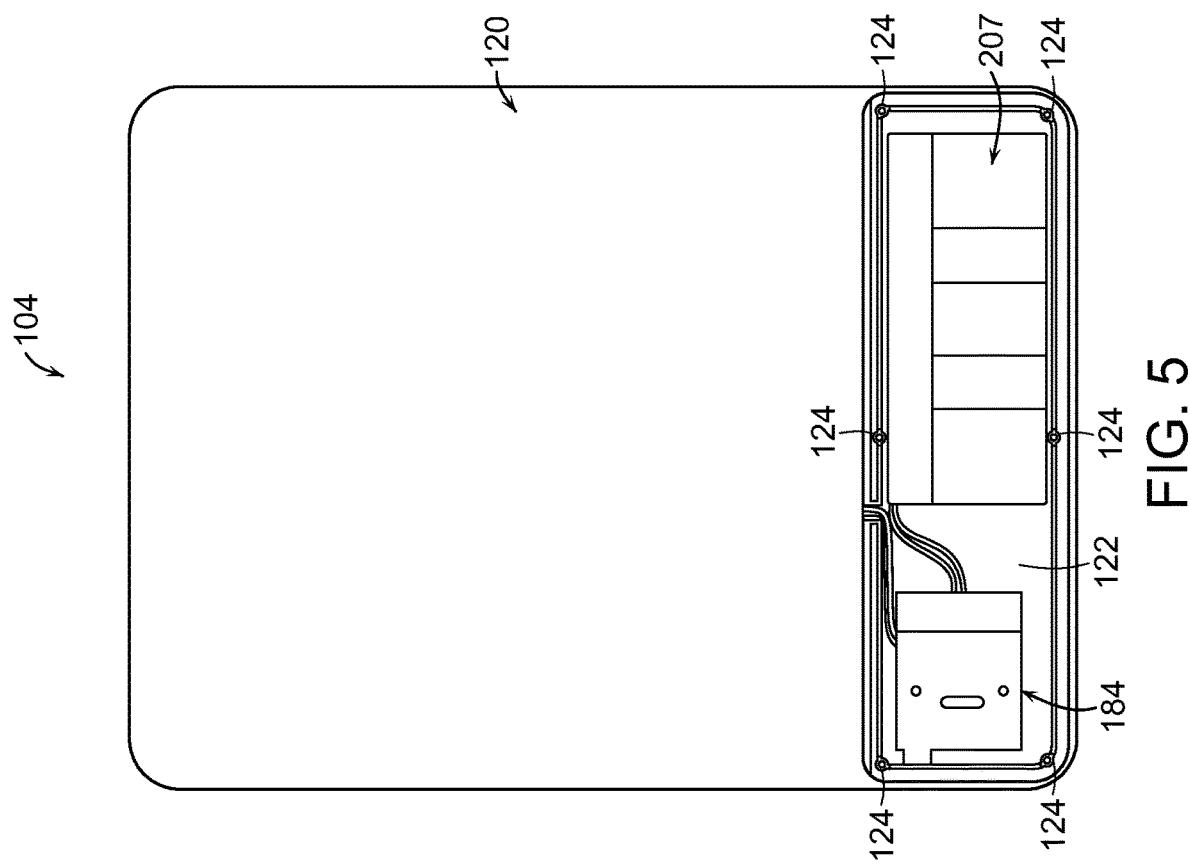
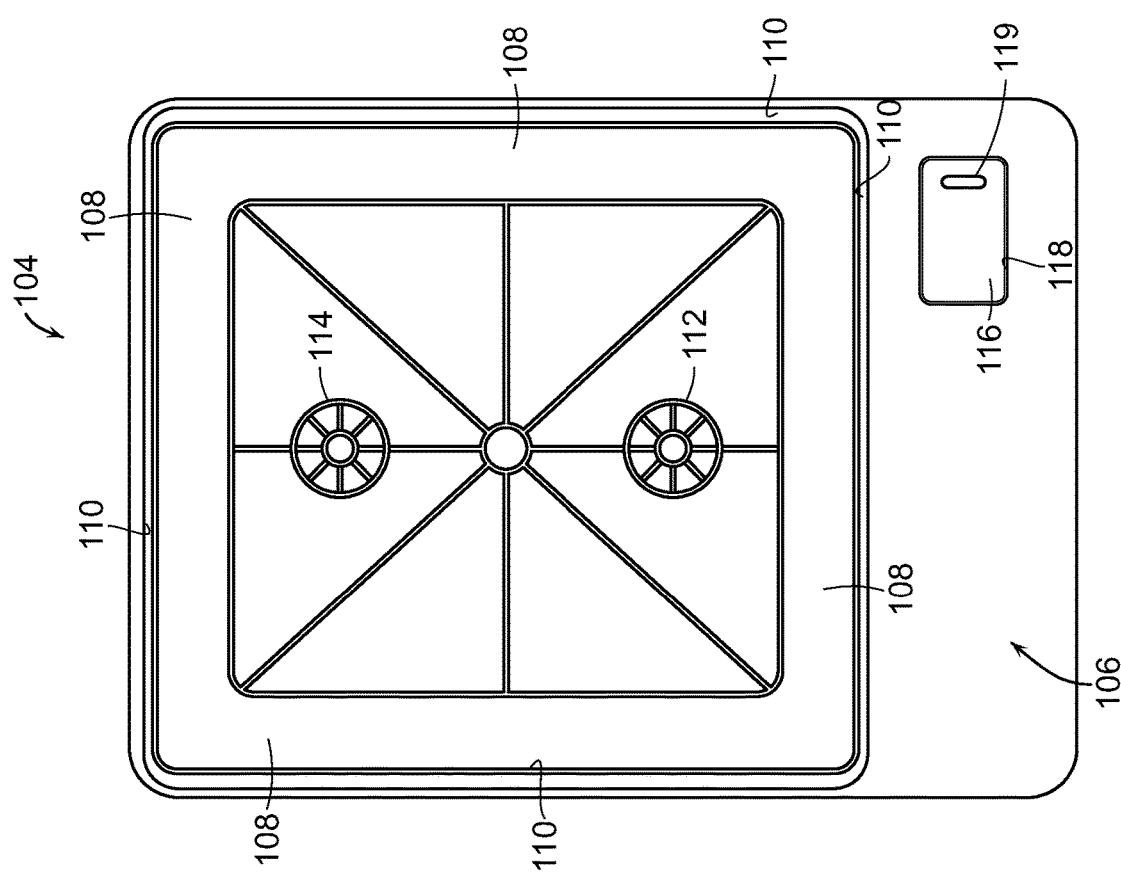

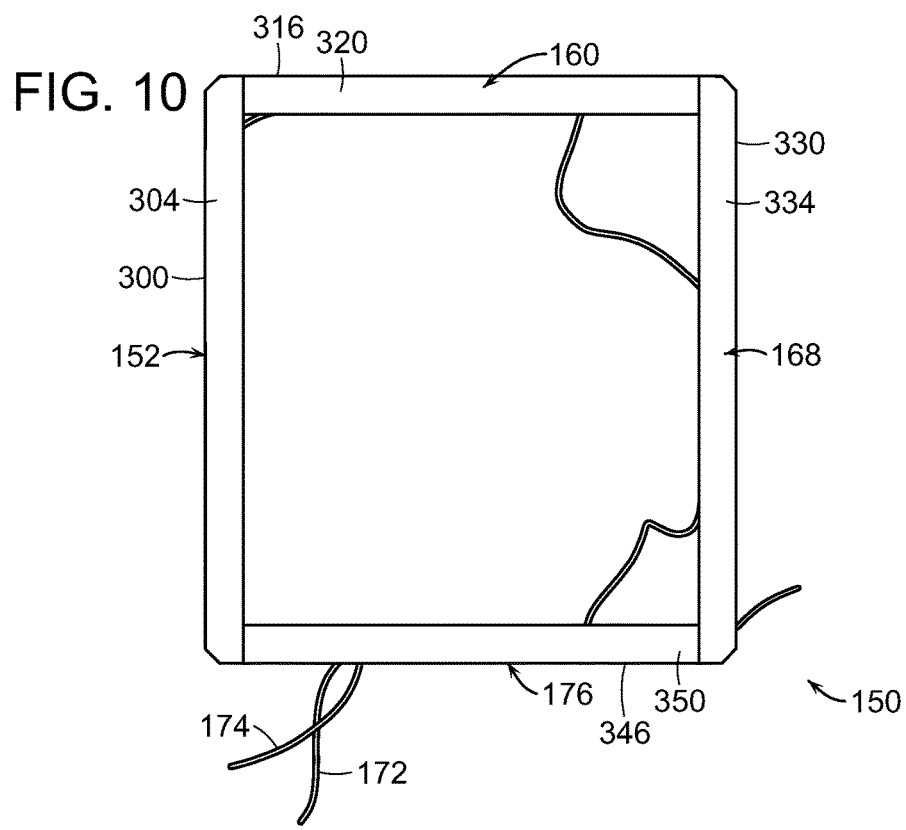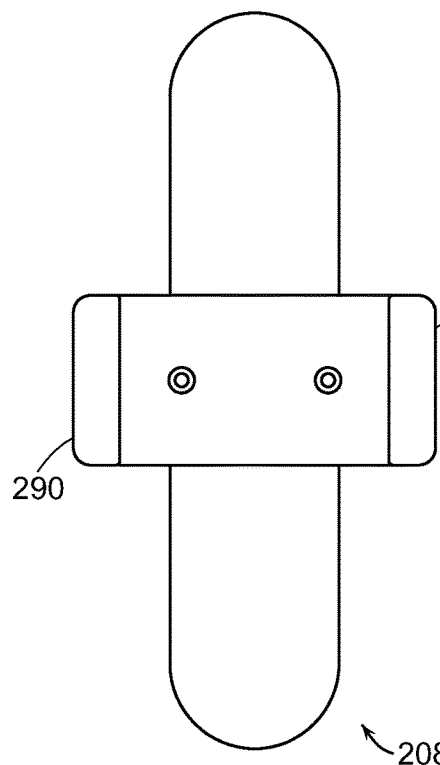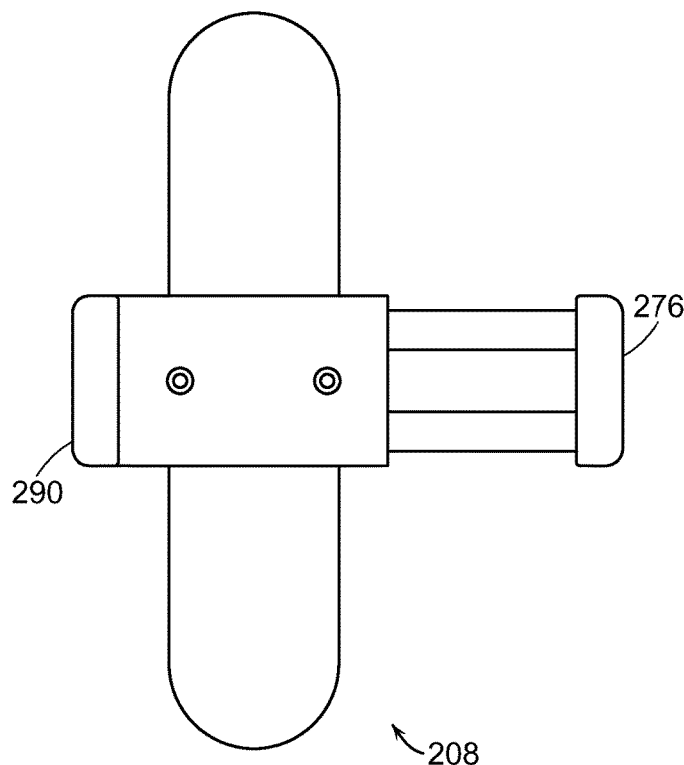

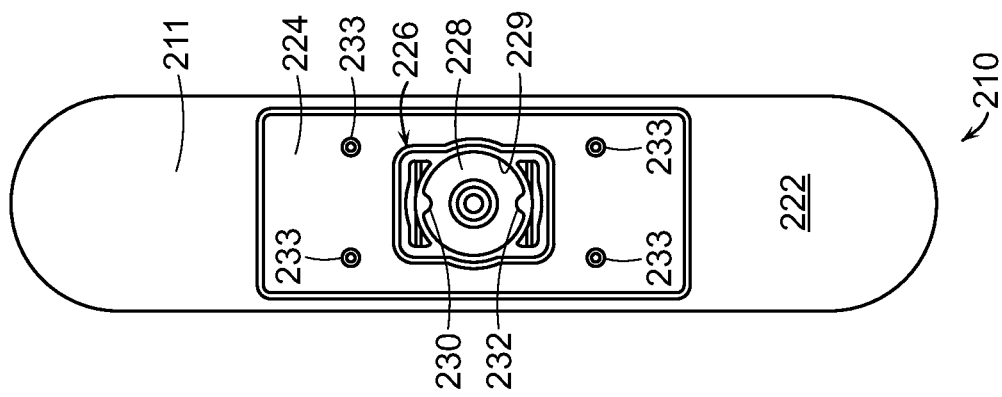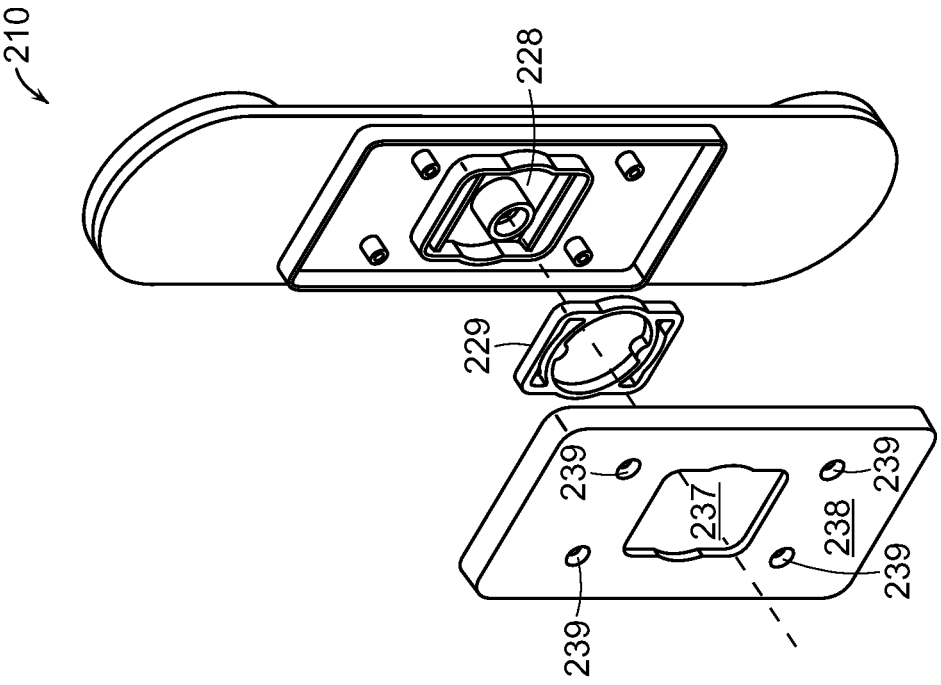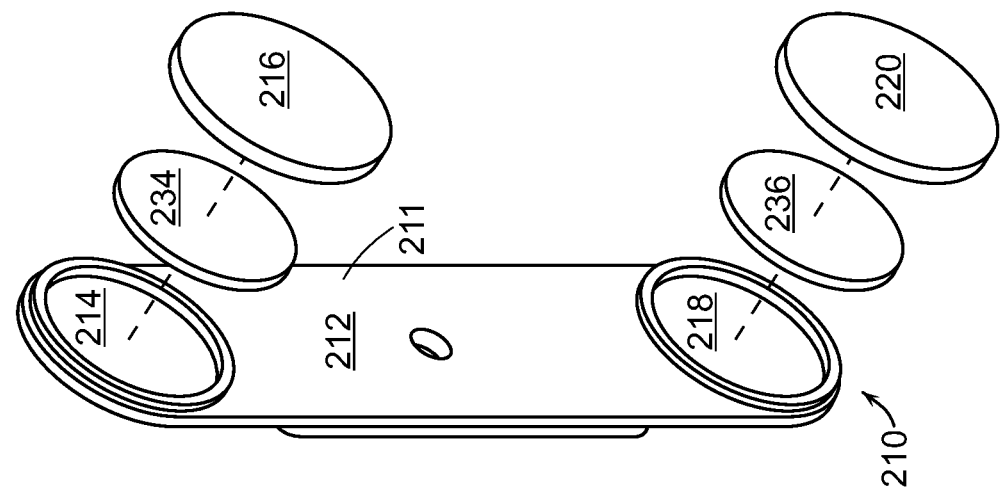

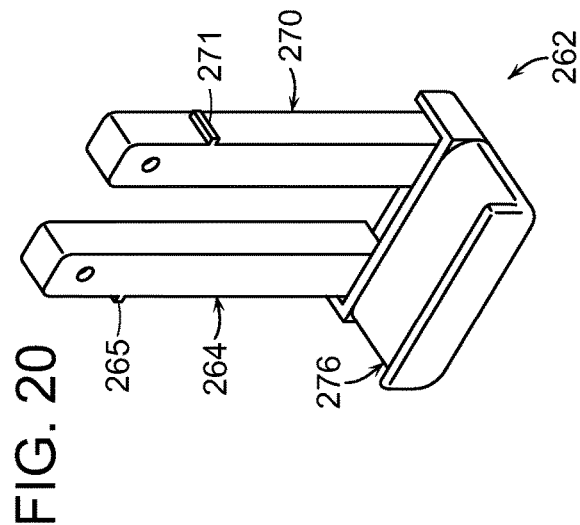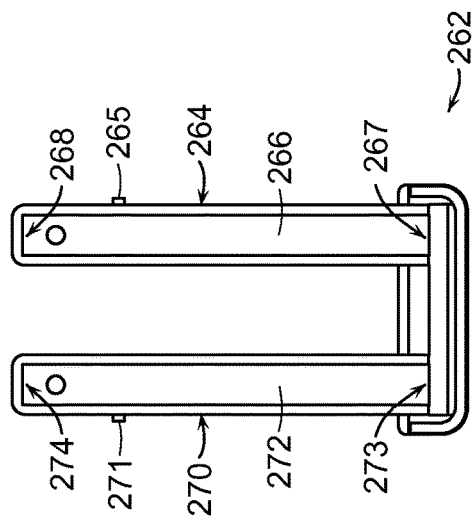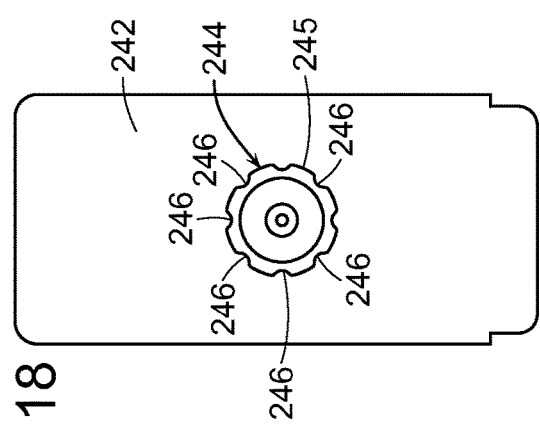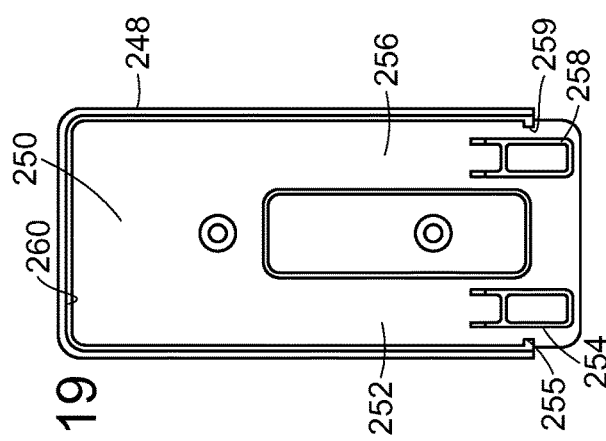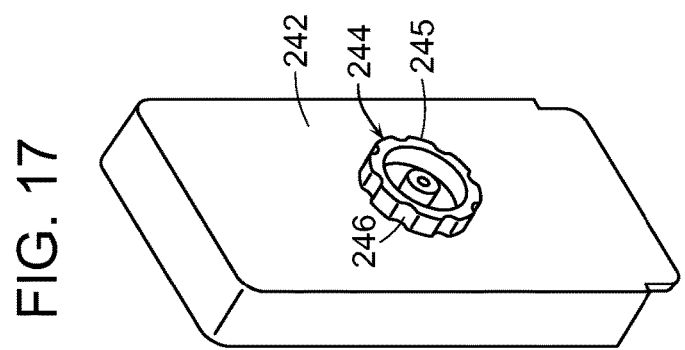

SELFIE APPARATUS

CROSS-REFERENCE TO RELATED APPLICATIONS

This application is a continuation of and claims priority to U.S. Utility application Ser. No. 16/700,343 filed on Dec. 2, 2019, now pending, which is a continuation of and claims priority to U.S. Utility application Ser. No. 16/111,324 filed on Aug. 24, 2018, now U.S. Pat. No. 10,495,950, which is a continuation of and claims priority to U.S. Utility application Ser. No. 15/480,664 filed on Apr. 6, 2017, now abandoned, which is a continuation of and claims priority to U.S. Utility application Ser. No. 14/678,996 filed on Apr. 5, 2015, now U.S. Pat. No. 9,648,217, which claims priority to U.S. Provisional Application Ser. No. 62/136,462 filed on Mar. 21, 2015, now expired, all of which are hereby incorporated into this specification by reference in their entirety.

BACKGROUND OF THE INVENTION

Taking a selfie picture has become a trendy way of taking pictures alone or with other people. Conventionally, a person takes a selfie picture by holding an electronic communication device such as an iPhone® having a camera away from the person's body and then presses a trigger to take the picture. Another conventional device secures the communication device to the end of a telescopic pole allowing the person to extend the pole and camera to the desired position. Such conventional methods and devices do not provide an easy way to take a high quality selfie picture.

SUMMARY OF THE INVENTION

One object of the present invention was to develop a device for use with an electronic communication device, such as an IPhone®, having a camera to take a selfie picture that is easy to use and provides a high quality selfie picture or video.

The present invention is an apparatus for use with a communication device, such as an IPhone®, having a camera enabled by a wireless communication chip such as Bluetooth® to take a selfie picture or video. The apparatus comprises a tri-pod stand comprising first, second, and third legs. The tri-pod stand further comprises a lower support pole removably engaged with an upper support pole. The apparatus further comprises a control unit removably engaged with the upper support pole. The apparatus further comprises a first flexible arm extending upward from the control unit. The apparatus further comprises a second flexible arm extending upward from the control unit. The apparatus further comprises a third flexible arm extending upward from the control unit. The third flexible arm being disposed between the first flexible arm and the second flexible arm. The apparatus further comprises a first light source engaged with the first flexible arm. The apparatus further comprises a second light source engaged with the second flexible arm. The apparatus further comprises a fastener engaged with the third flexible arm to removably engage the communication device and position the camera between a portrait view and a landscape view. The control unit being adapted to send a first signal to the communication device to activate the first and second light sources and a second signal to activate the camera of the communication device. The apparatus further comprises a remote control device adapted to send a signal to the control unit causing the control unit to send the second signal to the communication device to activate the camera and take a picture. Unlike conventional devices, the apparatus of the present invention allows a person to easily take a high quality selfie picture or video.

BRIEF DESCRIPTION OF THE DRAWINGS

The following description of the invention will be more fully understood with reference to the accompanying drawings in which:

FIG. 1 is a perspective view of a device for use in taking pictures according to a first embodiment the present invention showing an electronic communication device, such as an IPhone®, in a vertical or portrait orientation;

FIG. 2 is a perspective view of the device according to the first embodiment of the present invention showing the electronic communication device in a horizontal or landscape orientation;

FIG. 3 is an exploded view of the device according to the first embodiment of the present invention showing a housing, a mirror assembly, an input device, and a fastener;

FIG. 4 is a front view of the housing showing a cavity to receive the mirror assembly and a cavity to receive the input device;

FIG. 5 is a rear view of the housing showing a cavity to receive a control circuit and a battery;

FIG. 10 is a bottom view of the light source (LED assembly);

FIG. 11 is a top view of the fastener with the moveable arm in its normal unbiased state and rotated ninety degrees to a horizontal or landscape orientation;

FIG. 12 is a top view of the fastener with the moveable arm in a fully extended and biased state and rotated 90 degrees to a horizontal or landscape orientation;

FIG. 14 is an bottom exploded view of the base showing first and second cavities to retain first and second magnets, respectively;

FIG. 15 is a top exploded view of the base showing a female connector (in the form of a mechanical spring disposed within a receptacle) that allows the carrier housing to rotate to various locked positions, including a vertical or horizontal orientation;

FIG. 16 is a top view of the base showing a female connector that allows the carrier housing to rotate to various locked positions, including a vertical or horizontal orientation;

FIG. 17 is a bottom perspective view of the carrier housing showing a male connector that is rotatably engaged with the female connector of the base;

FIG. 18 is a bottom view of the carrier housing;

FIG. 19 is a top view of the carrier housing showing a cavity to receive the movable arm and the fixed arm;

FIG. 20 is a top perspective view of the moveable arm showing first and second legs and a gripping arm;

FIG. 21 is a bottom view of the moveable arm showing first and second channels disposed within the first and second legs, respectively, to receive first and second mechanical springs, respectively;

DESCRIPTION OF THE INVENTION

Figure 6:
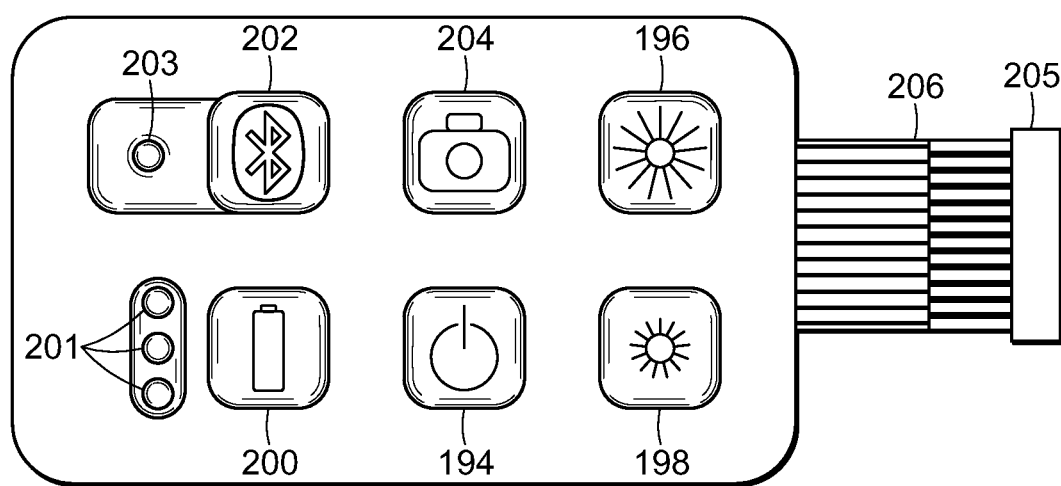
FIG. 6 is a perspective view of the input device showing a membrane switch having an outer face with multiple function buttons, a wire harness, and a connector.

Referring to FIGS. 1 and 2, the present invention is a device 100 for use with an electronic communication device 50, such as an IPhone®, having a camera 52 enabled by a wireless communication chip such as Bluetooth® to take a selfie picture or video. Communication device 50 may be type of electronic device having a camera enabled with a communication ship such as Bluetooth®, including but not limited to smart phones, video recording devices, and cameras. Device 100 generally comprises a hand mirror 102 having a mirror surface 133. Device 100 further comprises a fastener 208 removably engaged with mirror surface 133 of hand mirror 102 and communication device 50 to position camera 52 in front of mirror surface 133. Fastener 208 comprises spring loaded gripping arms 276 and 290 adapted to secure left and right sides 54 and 56 of communication device 50, respectively, and to support communication device 50 in one of several positions, including a vertical or portrait orientation (FIG. 1) and a horizontal or landscape orientation (FIG. 2). Hand mirror 102 further comprises a control circuit 184 (not shown) having a wireless communication chip 160 (not shown) such as a Bluetooth® communication chip. Hand mirror 102 further comprises a light source 150, such as light emitting diodes, disposed within and about the perimeter of mirror surface 133 and electrically connected with control circuit 184. When activated, light source 140 emits light from mirror surface 133 to illuminate a picture taking area in front of mirror surface 133. Hand mirror 102 further comprises an input device 192, such as a membrane switch, electrically connected with control circuit 184. Input device 192 generally comprises a dim up button 196 and a dim down button 198 to control the intensity of light source 150 and a camera activation button 204 to wirelessly activate camera 50. Input device 192 further comprises a communication chip activation button 202 to control on and off of communication chip 190. In operation, a person attaches fastener 208 to mirror surface 133 and positions camera 50 to a portrait, landscape or other orientation. The person may then turn on light source 150 to the desired intensity and grip device 100 with his/her hands to orientate camera 52 of communication device 50 for a desired picture. When ready, a person may depress on/off button 202 to turn on communication chip 190 and then the person may pair communication device 50 with communication chip 190 of device 100. A person may then depress camera activation button 204 causing camera 52 to take a selfie picture or video of the person or persons. Unlike conventional devices, device 100 allows a person to take a high quality selfie picture or video.

Referring to FIG. 3, hand mirror 102 generally comprises a housing 104, a mirror assembly 130, input device 192 and control circuit 184 as previously identified, and a battery 207. Mirror assembly 130 is securely engaged within a front portion 106 of housing 104. Similarly, input device 192 is securely engaged within and accessible from front portion 106 of housing 104. Control circuit 184 and battery 207 are disposed within and accessible from a rear portion 120 of housing 104.

Referring to FIG. 4, front portion 106 of housing 104 comprises a cavity 108 to receive mirror assembly 130. Cavity 108 comprises a support rib 110 to support mirror assembly 130 that is secured within cavity 108 by conventional means such as adhesive. Front portion 106 further comprises a cavity 112 and a cavity 114 sized to allow insertion of magnets 146 and 148 (to be described) of mirror assembly 130 when assembled. As will be more fully described herein, cavities 112 and 114 are also used as guides in the assembly of mirror assembly 130. Front portion 106 further comprises a cavity or compartment 116 adapted to receive input device 192. Input device 192 is secured within cavity 116 by conventional means such as adhesive. Cavity 116 further comprises an opening 119 formed in a floor 118 of cavity 116 to provide access for a wire harness 205 and a connector 206 to pass thru and be connected with control circuit 184 disposed in a cavity 122 (to be described) formed in rear portion 120 of housing 104.

Referring to FIG. 5, rear portion 120 of housing 104 comprises a cavity or compartment 122 sized to receive control circuit 184 and battery 207. Cavity 122 may be closed by a cover 126 (FIG. 3) is removably secured to bosses 124 by conventional means such as screws (not shown) for replacement of control circuit 184 and/or battery 207. Housing 104 and cover 126 are made from plastic and fabricated by conventional molding processes and operations.

Referring to FIG. 6, input device 192 is a membrane switch comprising a light source on/off button 194 that when depressed sends a signal to control circuit 184 that is configured to turn on or turn off light source 150. Input device 192 further comprises a dim up button 196 that when depressed sends a signal to control circuit 185 that is configured to increase the intensity of light source 150. Input device 192 further comprises a dim down button 198 that when depressed sends a signal to control circuit 185 that is configured to decrease the intensity of light source 150. Input device 192 further comprise a communication chip on/off button 202 that when depressed sends a signal to control circuit 184 that is configured to pair or unpair a wireless communication chip 190 (to be described) of control circuit 184 with the wireless communication chip of communication device 50. Input device 192 further comprises a communication chip status indicator light 203 that flashes when wireless communication chip 190 of control circuit 184 is not paired with the wireless communication chip of communication device 50 but turned on. Communication chip status indicator light 203 remains constantly on when wireless communication chip 190 of control circuit 184 is paired with the wireless communication chip of communication device 50. Input device 192 further comprises a camera activation button 204 that when depressed sends a signal to control circuit 184 that is configured to send a signal to the communication chip of communication device 50 to trigger or activate camera 52 to take a picture or start or stop a video. Input device 192 further comprise a battery life indicator button 200 and battery life indicator lights 201 to indicate the remaining charge of battery 207. Input device 192 further comprises a wire harness 205 and a connector 206 that removably engages with a corresponding connector (not shown) of control circuit 184. Input device 192 in the form of a membrane switch is available from Shenzhen Haiwen Membrane Switch Co., Ltd., Xinahua 1 Road, Baoan 42th District, Shenzhen, China (www.szhaiwen.com).

Figure 7:
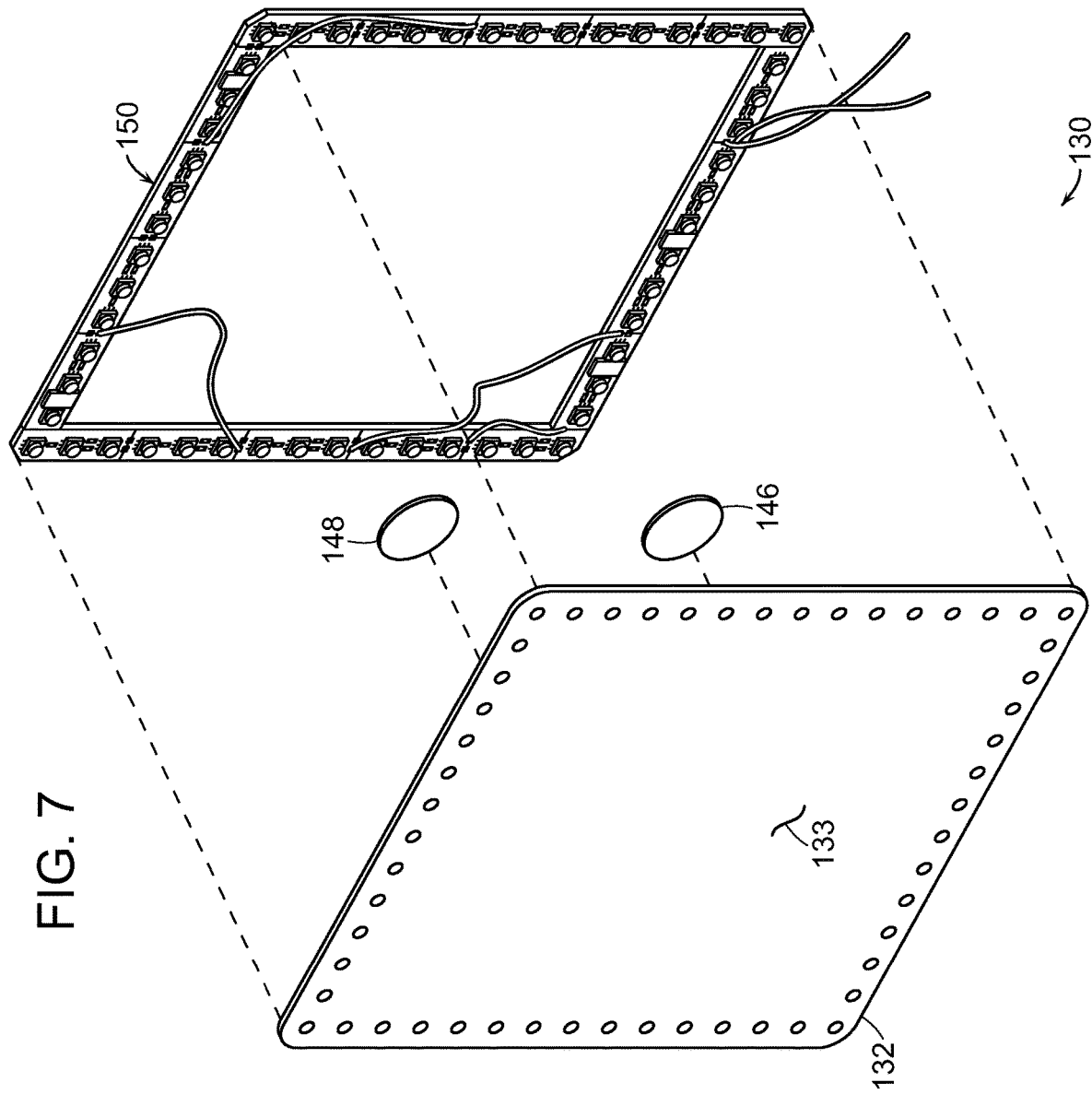
FIG. 7 is an exploded view of a mirror assembly showing a mirror, a light source (LED assembly), and two magnets.
Figure 8:
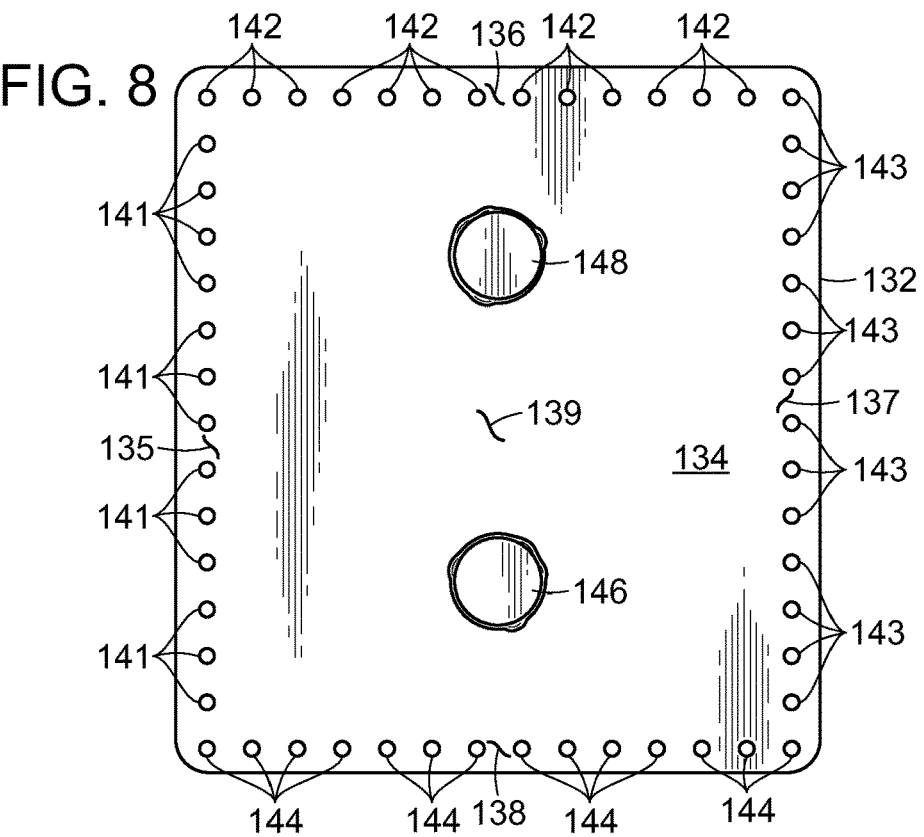
FIG. 8 is a rear view of the mirror showing the two magnets attached thereto by adhesive and clearance holes for engagement of the LEDS of the light source.

Referring to FIGS. 7-8, mirror assembly 130 generally comprises a body 132, magnets 146 and 148, and a light source 150. Body 132 comprises a front mirror surface 133 (FIG. 7) and a rear surface 134 (FIG. 8) having a left border portion 135, a top border portion 136, right border portion 137, a bottom border portion 138, and a central portion 139. Body 132 further comprises a plurality of clearance holes 141 disposed along left border portion 135. Body 132 further comprises a plurality of clearance holes 142 disposed along top border portion 136. Body 132 further comprises a plurality of clearance holes 143 disposed along right border portion 137. Body 132 further comprises a plurality of clearance holes 144 disposed along bottom border portion 138. Clearance holes 141, 142, 143, and 144 are sized so that when light source 50 is activated, light is emitted from mirror surface 133 thru clearance holes 141, 142, 143, and 144. Magnets 146 and 148 are secured to central portion 139 of rear surface 136 by conventional means such as adhesive during assembly. Mirror assembly 130 is fastened to cavity 108 of housing 104 by conventional means such as adhesive. Body 132 is made of ABS plastic and mirrored surface 134 is made from 3 mm mirror glass that is a fastened to body 132 by conventional means such as adhesive. Body 132 with mirrored surface 134 thereon is readily available in sheet form and can be cut to any desired size and shape by conventional cutting operations. Magnets 146 and 148 are neodymium disc magnets available as Part No. N35 from AIM Magnet Shenzhen Co., LTD, No. 16-3, Songshan West Road, Shajing Street, Baoan, Shenzhen, China (www.magnet168.com). In other embodiments, body 132 of mirror assembly 130 may be significantly larger and include more than two magnets so that the position of fastener 208 can be adjusted about the mirror surface.

Figure 9:
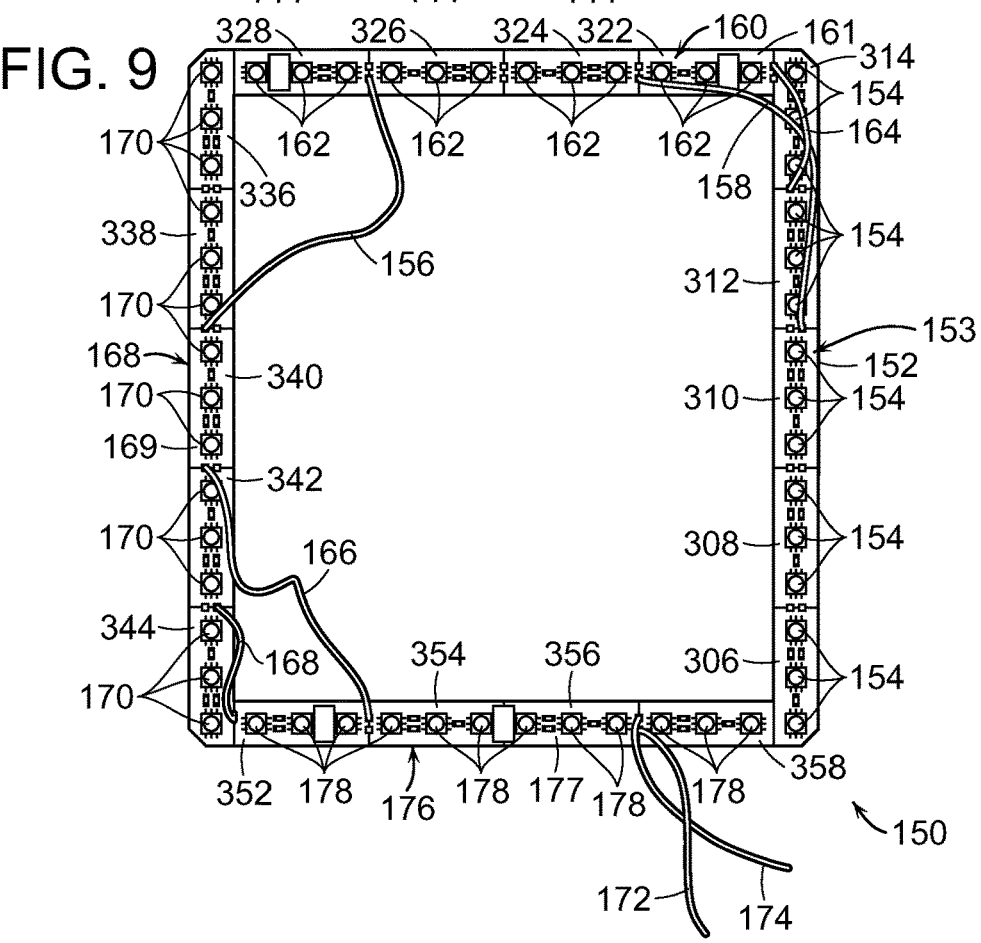
FIG. 9 is a front view of the light source (LED assembly)

Referring to FIGS. 9 and 10, where a front view of light source 150 (FIG. 9) and a rear view of light source 150 (FIG. 10) are illustrated. Light source 150 comprises a first printed circuit board assembly 152, a second printed circuit board assembly 160, a third printed circuit board assembly 168, and a fourth printed circuit board assembly 176. First printed circuit board assembly 152 generally comprises a base 300 having upper and lower surfaces 302 and 304, and printed circuit boards 306, 308, 310, 312, and 314 mounted to upper surface 302 by conventional means such as adhesive. Printed circuit board assembly 152 assembly further comprises a plurality of light emitting diodes 154 connected with each of printed circuit boards 306, 308, 310, 312, and 314 by conventional means such as surface mounting processes. Light emitting diodes 154 are electrically connected in parallel with each other and controlled by control circuit 146. Printed circuit board assembly 152 is adhesively secured to left border portion 135 of mirror surface 136 of body 132 by conventional means such that light emitting diodes 154 are centered and/or aligned with clearance holes 141 of body 132 of mirror assembly 130 (FIG. 8). Second printed circuit board assembly 160 generally comprises a base 316 having upper and lower surfaces 318 and 320, and printed circuit boards 322, 324, 326, and 328 mounted to upper surface 318 by conventional means such as adhesive. Printed circuit board assembly 160 further comprises a plurality of light emitting diodes 162 connected with each of printed circuit boards 322, 324, 326, and 328 by conventional means such as surface mounting processes. Light emitting diodes 162 are electrically connected in parallel with each other and controlled by control circuit 146. Printed circuit board assembly 160 is adhesively secured to top border portion 136 of rear surface 136 by conventional means such that light emitting diodes 162 are centered and/or aligned with clearance holes 142 of body 132 (FIG. 8). Third printed circuit board assembly 168 generally comprises a base 330 having upper and lower surfaces 332 and 334, and printed circuit boards 336, 338, 340, 342, and 344 mounted to upper surface 332 by conventional means such as adhesive. Printed circuit board assembly 168 further comprises a plurality of light emitting diodes 170 connected with each of printed circuit boards 336, 338, 340, 342, and 344 by conventional means such as surface mounting processes. Printed circuit board assembly 168 is adhesively secured to right border portion 137 of rear surface 136 of body 132 by conventional means such that light emitting diodes 170 are centered and/or aligned with clearance holes 143 of body 132 (FIG. 8). Fourth printed circuit board assembly 176 generally comprises a base 346 having upper and lower surfaces 348 and 350, and printed circuit boards 352, 354, 356, and 358 mounted to upper surface 348 by conventional means such as adhesive. Printed circuit board assembly 176 further comprises a plurality of light emitting diodes 178 connected with each of printed circuit boards 352, 354, 356, and 358 by conventional means such as surface mounting processes. Printed circuit board assembly 176 is adhesively secured to bottom border portion 138 of rear surface 136 of body 132 by conventional means such that light emitting diodes 178 are centered and/or aligned with clearance holes 142 of body 132 (FIG. 8). Wires 156, 158, 164, 166, and 168 are provided to connect light emitting diodes 154, 162, 170, 178 in parallel with each other. A suitable voltage across wires 172 and 174 turns on light source 150. As will be more fully described, wires 172 and 174 electrically connect light source 150 with control circuit 184 and battery 207. Light emitting diodes of light source 150 may be any type of light diode such as a 50/50 LED. Base 300, 316, 330, and 346 of printed circuit board assemblies 160, 160, 168, and 176, act as heat sinks to cool light emitting diodes 154, 162, 170, and 178. Bases 300, 316, 330, and 346 are made from 6063 grade aluminum that is widely available. Similarly, printed circuit boards 306, 308, 310, 312, 314, 322, 324, 326, 328, 336, 338, 340, 342, 344, 352, 354, 356, and 358 are widely available and ready for assembly with three or four light emitting diodes.

Figure 13:
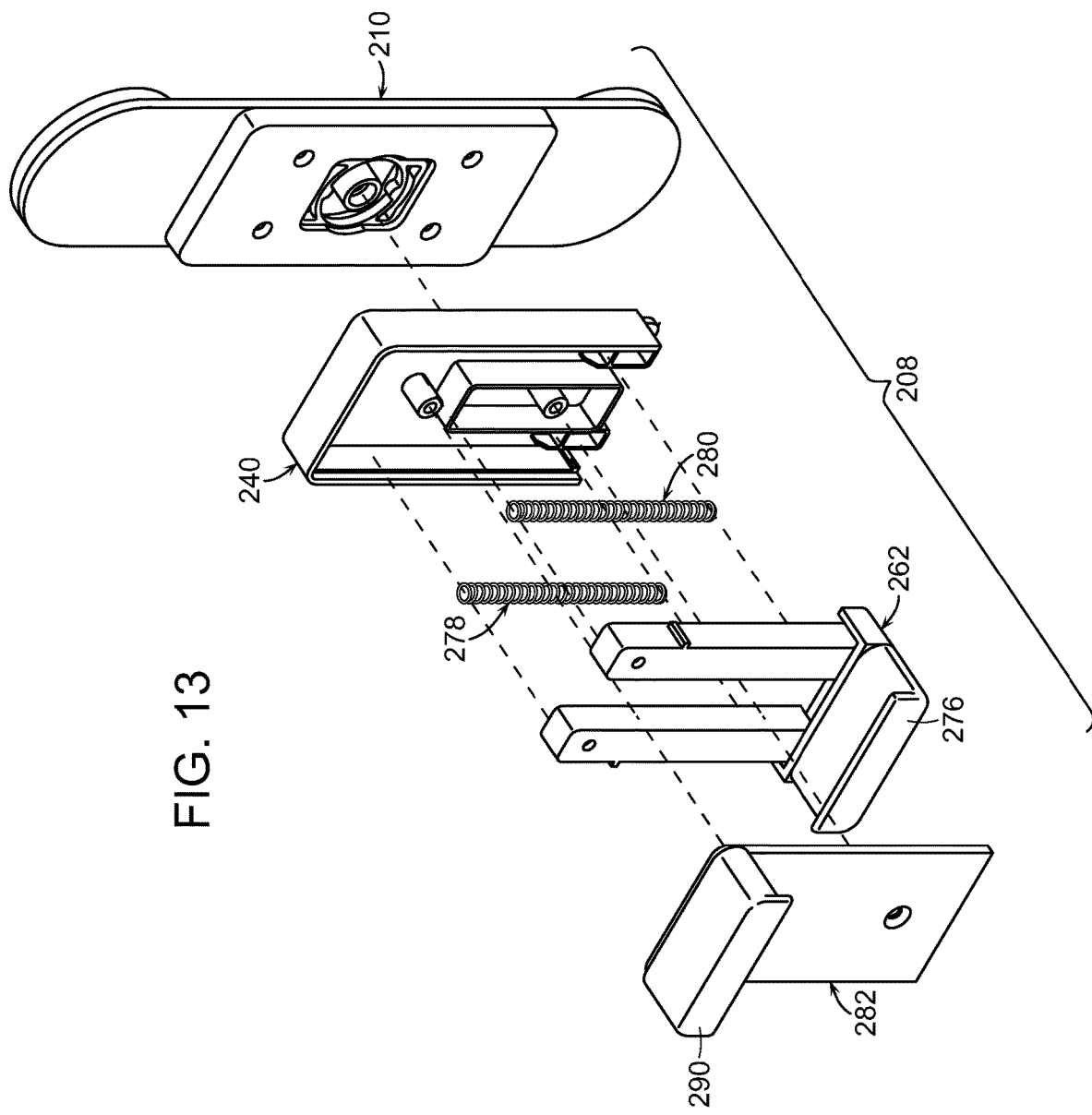
FIG. 13 is an exploded view of the fastener showing a base, a carrier housing, a moveable arm, first and second springs, and a fixed arm.

Referring to FIGS. 11-13, where fastener 208 is shown a retracted position (FIG. 11) and an extended position (FIG. 12). In the extended position, communication device 50 can be inserted between gripping arms 276 and 290. In the retracted position, sides 54 and 56 of communication device 50 are secured by gripping arms 276 and 290. As shown by FIG. 13, fastener 208 generally comprises a base assembly 210, a carrier housing 240 rotatably engaged with base assembly 210, a moveable arm 262, springs 278 and 280, and a fixed arm 282.

Referring to FIGS. 14-16, base assembly 210 generally comprises a body 211 having a rear portion 212 (FIG. 14) and a front portion 222 (FIG. 15). Rear portion 212 comprises a cavity 214 designed to receive a magnet 234. A cover 216 is secured with cavity 204 by conventional means, such as adhesive, to secure magnet 234 therein. Rear portion 212 further comprises a second cavity 218 designed to receive a magnet 236. A cover 220 is secured with cavity 218 by conventional means, such as adhesive, to secure magnet 236 therein. Magnets 234 and 236 are neodymium disc magnets available as Part No. N35 from AIM Magnet Shenzhen Co., LTD, No. 16-3, Songshan West Road, Shajing Street, Baoan, Shenzhen, China (www.magnet168.com). Front portion 222 of body 211 comprises a cavity 224 and a female connector 226 disposed within cavity 224. Female connector 226 rotatably engages with a male connector 244 (to be described) of carrier housing 240. Female connector 226 comprises a receptacle 228 and a mechanical spring 229 disposed in receptacle 228. Mechanical spring 229 is retained within receptacle 228 by a cover 238. Cover 238 comprises a central opening 237 to allow free rotation of male connector 244 (to be described) of carrier housing 240 with female connector 226. Cover 238 further comprises openings 239 to allow screws (not shown) to be secured to corresponding bosses of cavity 224. Mechanical spring 229 comprises protrusions 230 and 232 that can be flexed or biased inward. As will be more fully described, protrusions 230 and 232 lock male connector 244 and therefore carrier housing 240, in one several positions, including a vertical or portrait orientation or a horizontal or landscape orientation. Cover 238 is secured to cavity 224 by conventional means such as screws (not shown). Cover 238 comprises an opening or clearance hole 239 so that male connector 24 of carrier housing 240 can pass thru opening 239 and engage with female connector 226. Base assembly 210 is made from plastic and fabricated by convention molding processes.

Referring to FIGS. 17-19, carrier housing 240 comprises a rear portion 242 (FIG. 17) and a front portion 248 (FIG. 18). Carrier housing 240 further comprises a male connector 244 extending outward from rear portion 242. Male connector 244 is adapted to rotatably engage with and be secured by female connector 226 of base assembly 200 in a number positions. In the embodiment shown, male connector 244 comprises a gear 245 having a plurality of indentations 246. Gear 245 rotatably engages with and is secured by receptacle 228 of female connector 226 of base assembly 200 in a number of positions equal to one-half of the number of indentations 246 employed with gear 245. Each pair of opposing indentations 246 of gear 245 are locked in a given position by protrusions 230 and 232 (FIG. 16) as gear 245 is rotated within receptacle 228 (FIG. 16). Carrier housing 240 further comprises a cavity 250 formed in front portion 248. Cavity 250 comprises a channel portion 252, a channel portion 256, and a flange portion 260 surrounding cavity 250. Carrier housing 240 further comprises an anchor 254 disposed at the end of channel portion 252. Anchor 254 serves to secure one end of spring 278 (FIG. 13). Carrier housing 240 further comprises an anchor 258 disposed at the end of channel portion 256. Anchor 258 serves to secure one end of spring 280 within channel portion 256 (FIG. 13). Carrier housing 240 further comprises a wall 255 formed at an inner end of channel portion 252 that may engage with a stop member 265 (to be described) of moveable arm 262. Carrier housing 240 further comprises a wall 259 formed at inner end of channel 256 that may engage with a stop member 271 (to be described) of moveable arm 262. Walls 255 and 259 may engage with stop members 265, and 271, respectively, to limit sliding movement of moveable arm 262 to a maximum point outward of channels cavity 252 and 256 of carrier housing 240. Carrier housing 240 is made from plastic and is fabricated by conventional injection molding processes and operations.

Referring to FIGS. 20 and 21, moveable arm 262 comprises a left leg 264, a right leg 270, and a gripping arm 276 engaged with left and rights legs 264 and 270. Left leg 264 comprises a channel 266 having inner and outer ends 267 and 268. Right leg 270 comprises a channel 272 having inner and outer ends 273 and 274. Channels 266 and 272 are adapted to enclose springs 278 and 280, respectively, to allow gripping arm 276 to extend or slide a distance outward of carrier housing 240 creating a bias within springs 278 and 280 that urges or moves moveable arm 262 back to the non-biased state (springs 278 and 280 are not compressed) within channel portions 252 and 256 of carrier housing 240. Moveable arm 262 further comprises a stop member 265 that may engage with wall 255 of channel portion 252 of carrier housing 240 and a stop member 271 that may engage with wall 259 of channel portion 256 of carrier housing 240 to stop or limit sliding movement of moveable arm 262 outward of carrier housing 240. In the embodiment shown, gripping arm 276 of movable member 262 can be spread or expanded a maximum of about eighty millimeters from gripping arm 290. Moveable arm 262 is made from plastic and is fabricated by conventional injection molding processes and operations.

Figure 22:
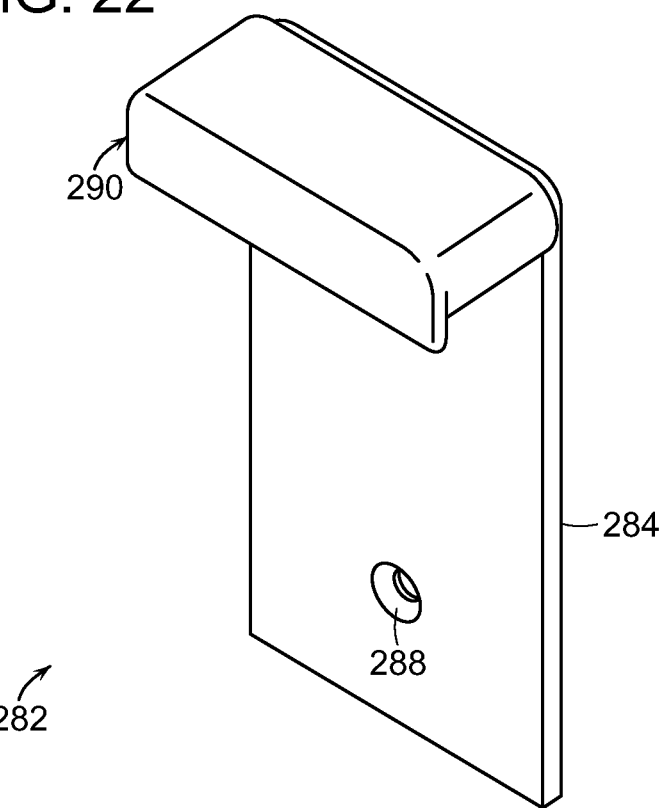
FIG. 22 is a top perspective view of the fixed arm showing a base that engages with the carrier housing and a gripping arm.
Figure 23:
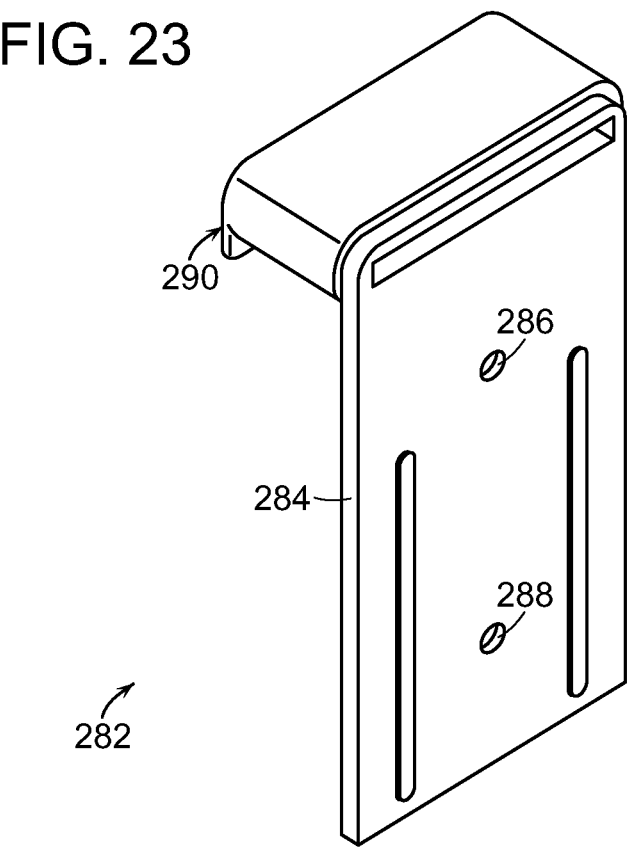
FIG. 23 is a bottom perspective view of the fixed arm showing a planar surface that engages with the carrier housing.

Referring to FIGS. 22 and 23, fixed arm 282 comprises a base 284 and a gripping arm 290. Base 284 comprises openings 286 and 288 to securely engage fixed arm 82 to carrier housing 240 by conventional means such as screws (not shown). Fixed arm also serves to contain moveable arm 262 within cavity 250 of carrier housing 240 while allowing back and forth sliding movement of moveable arm 262. Fixed arm 282 is made from plastic and is fabricated by conventional injection molding processes and operations.

Figure 24:
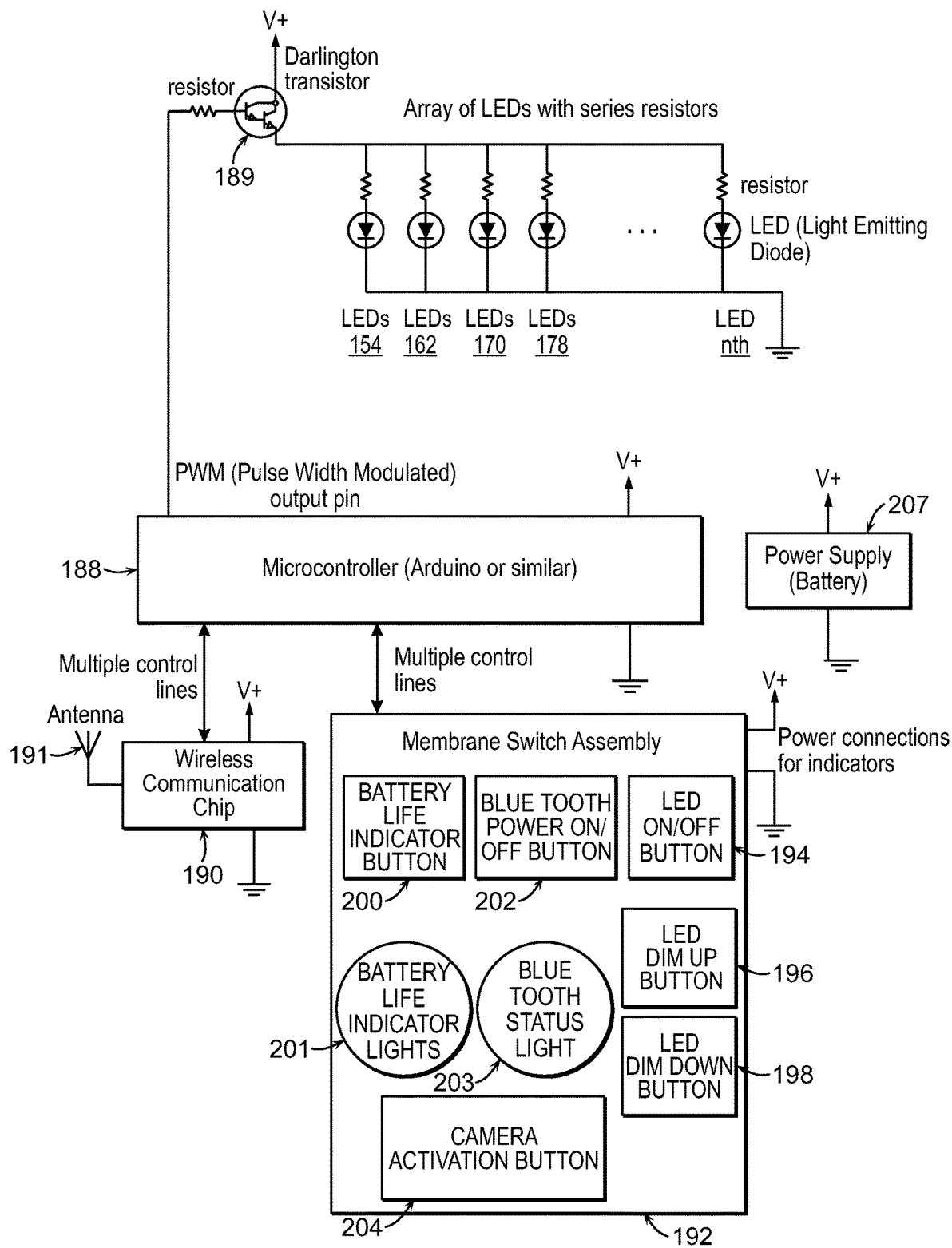
FIG. 24 is a high level schematic showing the electromechanical and electrical components of the first embodiment of the device.

Referring to FIG. 24, where a high level schematic illustrates input device 192, control circuit 184, battery 207, and light emitting diodes 154, 162, 170, and 178. Control circuit 184 generally comprises a wireless communication chip 190 and an antenna 191 electrically connected with a microcontroller 188 by a printed circuit board 186 (not shown). Microcontroller 188 is electrically connected with input device 192 and a battery 207 by conventional wiring and board mounted connectors. Microcontroller 188 is electrically connected with light emitting diodes 154, 162, 170, and 178 of light source 150 by a transistor 189 to control the intensity of light source 150 by pulse width modulation. Microcontroller 188 comprises a memory system (not shown) and a software module (not shown) stored on the memory system. Microcontroller 188 may be an Arduino Uno Rev3 type controller manufactured by Arduino Corporation (www.arduino.cc/en) and available online as Part No. 50 from Adafruit Industries, Inc., 150 Varick Street, New York, N.Y. 10013 (http://www.adafruit.com) which may be programmed with software module. Microcontroller 188 may be any type of presently and/or futurely developed electronic circuitry and/or discrete circuitry. The software module can be easily written in software or code written based upon the desired functionality of the various buttons of input device 192 (FIG. 6). For example, the software module comprises software or code configured to instruct microcontroller 188 to send control signals to transistor 189 to control the intensity of light emitting diodes 154, 162, 170, and 178 based upon signals received from input device 192. The software module further comprises software configured to instruct microcontroller 188 to send control signals to communication chip 190 based upon signals received from input device 192. Microcontroller 188 may be programmed or implemented in C/C++ programming language. Battery 207 is provided to charge microcontroller 188. Battery 207 is a 1,000 mA rechargeable battery available as Part No. JP554141 from Shenzhen Jinke Energy Development CO., LTD, No. 9-10 Building, Junxin Industrial Zone, Guanlan Street, Bao'an District, Shenzhen City, Guangdong, China. Battery 207 may be any type of power supply suitable for delivering power to microcontroller 188, and any other desired circuit components, and preferably rechargeable. Wireless communication chip 190 is a Bluetooth® communication chip available as Part No. TH08 from Shenzhen Techtion Electronics Co., LTD, 2F, Building C2, Huafeng Industrial Zone, Xixiang Avenue, Baoan, Shenzhen, China (www.techtion.cn).

Device 100 of the present invention provides significant improvements over conventional devices for taking selfie pictures. A person may turn on light source 150 to the desired intensity and grip device 100 with his/her hands to orientate camera 52 for a desired picture. When ready, the person may depress camera activation button 194 causing camera 52 to take a selfie picture or video of the person or persons. Unlike conventional devices, device 100 allows a person to quickly take a high quality selfie picture or video. Light source 150 illuminates the picture taking area in front of mirror surface 133 for taking an even higher quality selfie picture or video.

Figure 25:
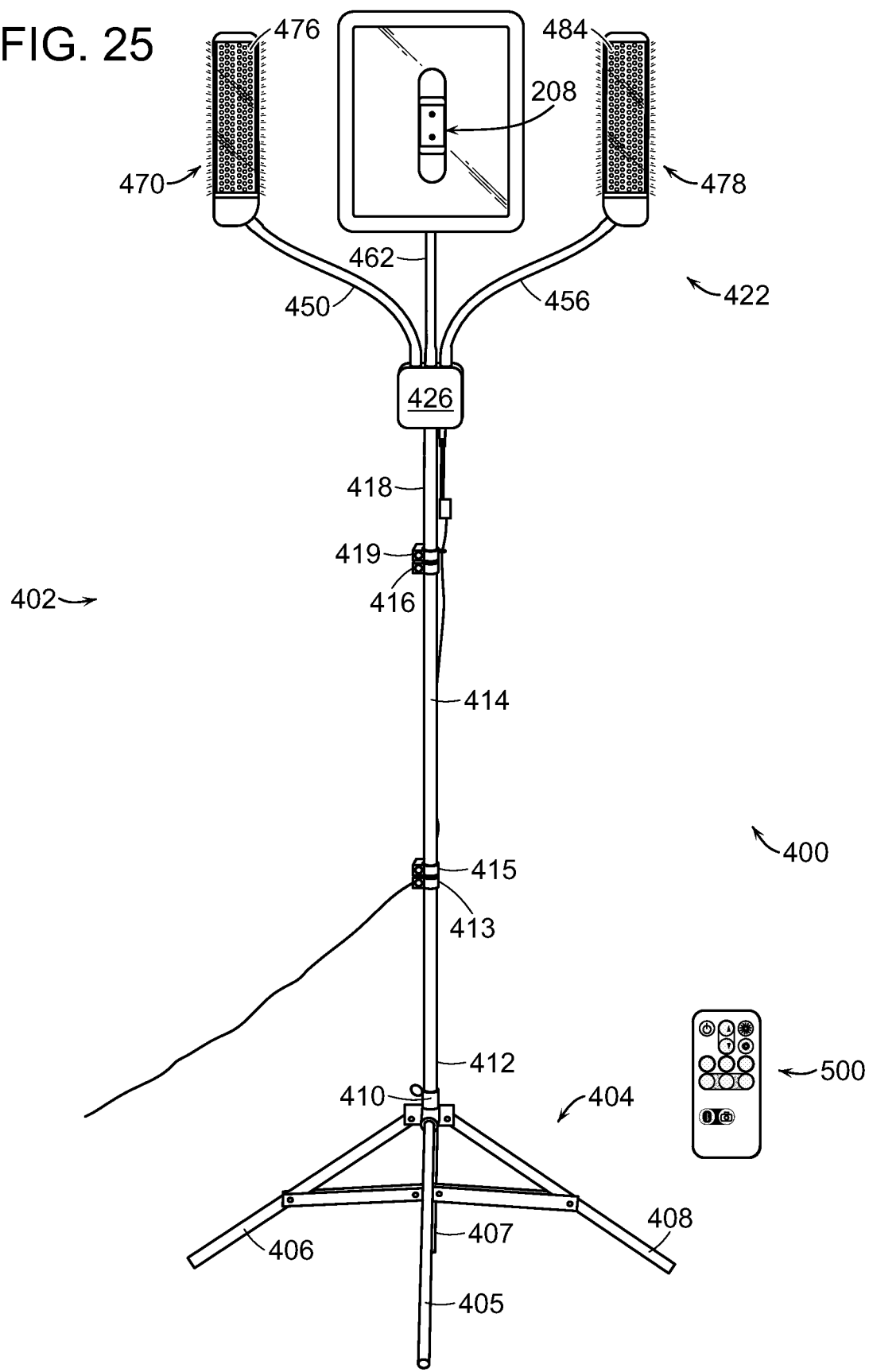
FIG. 25 is a perspective view of a light stand according to the present invention showing a light unit secured to a base unit, a mirror, a fastener removably engaged with the mirror to support an electronic communication device, such as an IPhone®, in a landscape orientation, and a remote control unit to control taking of a selfie picture or video.

Referring to FIG. 25, where a selfie light stand 400 according to the present invention is shown for use with a communication device 50, such as an IPhone®, having a camera enabled by a wireless communication chip such as Bluetooth,® to take a selfie picture or video. Light stand 400 generally comprises a tri-pod stand 402, a light unit 422 comprising light sources 470 and 478 and a control unit 426, and a mirror unit 486 having a mirror surface 498. Light stand 400 further comprises a fastener 208 (previously described) for securing communication device 50 to mirror surface 498 in one of several positions, including a vertical or portrait orientation and a horizontal or landscape orientation. Light stand 400 further comprises a remote control 500 adapted to send wireless signals to control unit 426 to increase and/or decrease the light intensity and/or temperature of light sources 270 and 487 and to activate camera 52 of communication device 50 to take a selfie picture or video.

With continued reference to FIG. 25, stand 402 comprises a base 404 having legs 405, 406, and 408 moveably secured to a connector 410. Stand 402 further comprises a lower support pole 410 and an intermediate support pole 414 telescopically engaged with lower support pole 410. Stand 402 further comprises a collar 413 secured to the upper end of lower support pole 410 and collar 415 secured to intermediate support pole 414. Collar 415 can be loosened and/or tightened so that intermediate pole 414 can be adjusted to any height by being telescopically moved within lower support pole 410. Stand 402 further comprises an upper support pole 418 and a collar 419 that can be loosened and/or tightened so that upper support pole 418 can be adjusted to any height by being telescopically moved within intermediate support pole 414. The upper end of upper support pole 418 is removably engaged with housing 428 of control unit 426 of light unit 422.

Figure 26:
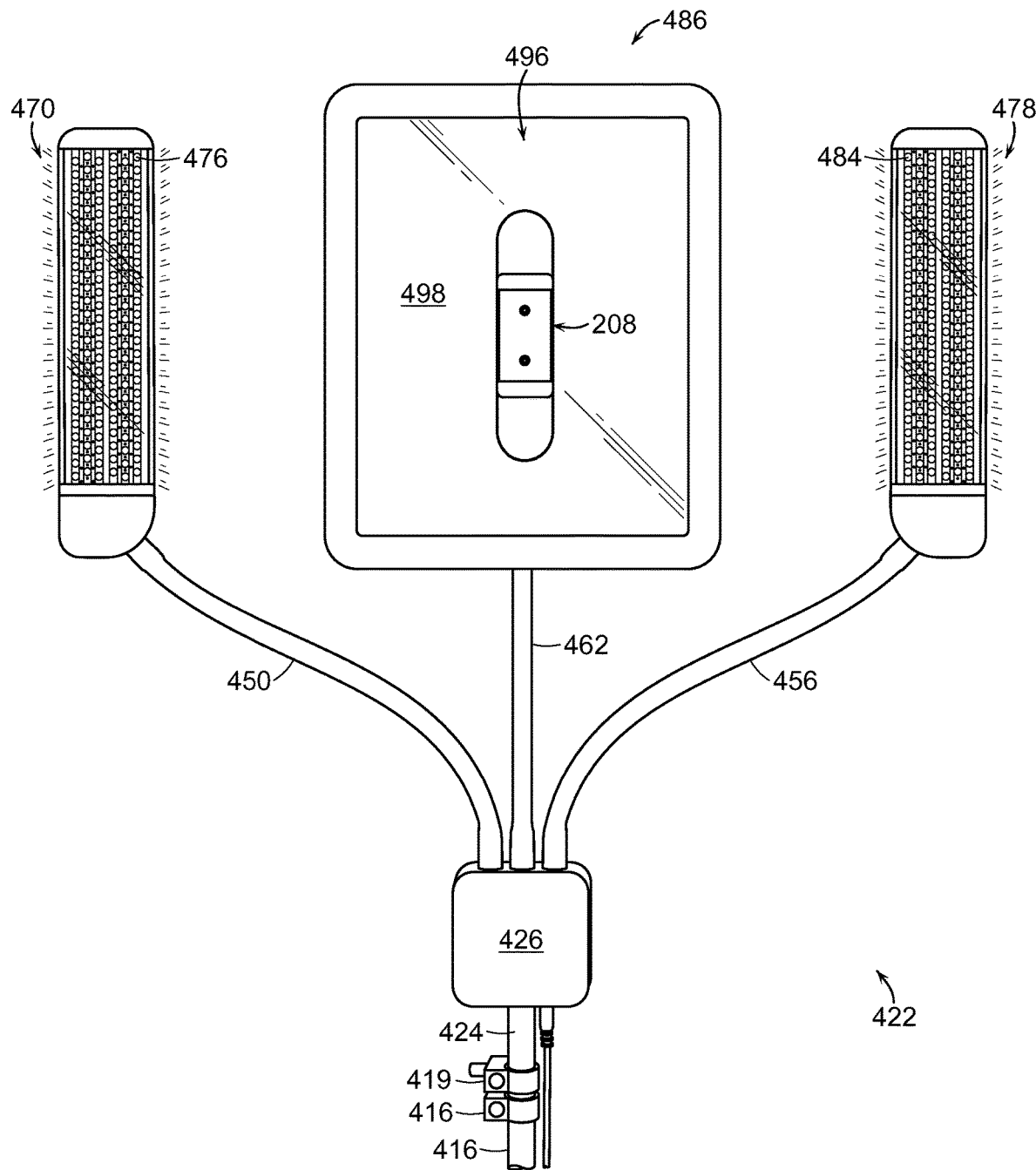
FIG. 26 is a perspective view of the light unit showing the fastener engaged with the mirror to removably support the electronic communication device in a portrait or landscape orientation.

Referring to FIG. 26, light unit 422 generally comprises a control unit 426, a left flexible arm 450, a right flexible arm 456, and a central flexible arm 462. Light unit 422 further comprises a light source 470 engaged with left flexible arm 450 and a light source 478 engaged with right flexible arm 456. Each of light sources 470 and 478 comprise a plurality of cool single color light emitting diodes 476 and a plurality of warm single color light emitting diodes 477 that are commonly known and widely available. In alternative embodiments, a plurality of three color RGB light emitting diodes may be used. As further shown, mirror unit 486 is removably engaged with a connector 468 (to be described) of central flexible arm 462 (FIG. 26). Fastener 208 is removably engaged with mirror surface 498 of mirror unit 486 for securing a communication device (not shown) as described in the first embodiment in one of several positions, including a vertical or portrait orientation and a horizontal or landscape orientation.

Figure 27:
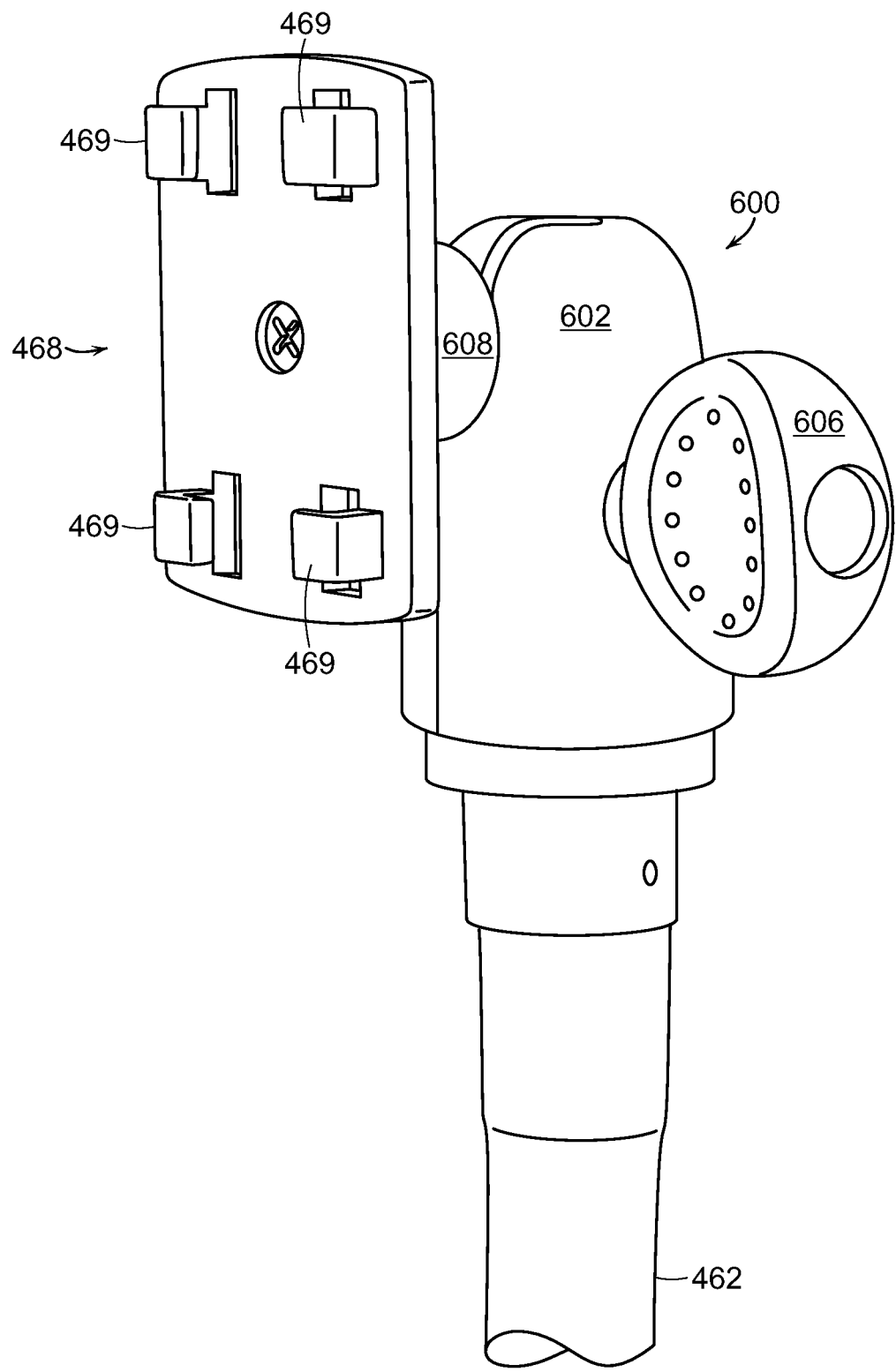
FIG. 27 is a perspective view of a connector secured to the upper end of a central of a third flexible arm of the light unit that is adapted to removably engage the mirror.

Referring to FIG. 27, male connector 468 is shown attached to an anchor 600 that is secured to an upper end of central flexible arm 462 by conventional means such as screw or rivet. Male connector 468 is secured to anchor 600 by conventional means such as a screw. Anchor 600 generally comprises a body 602, a screw 606, and a moveable male connector 604. Loosening of screw 606 allows moveable male connector 604 to be rotated upward or downward. Tightening of screw 606 secures moveable male connector 604 in a given position. Male connector 468 comprises a plurality of protrusions 469 that engage with a female connector 494 of mirror unit 268. Male connector 468 and anchor 600 are made from plastic and fabricated by convention molding processes.

Figure 29:
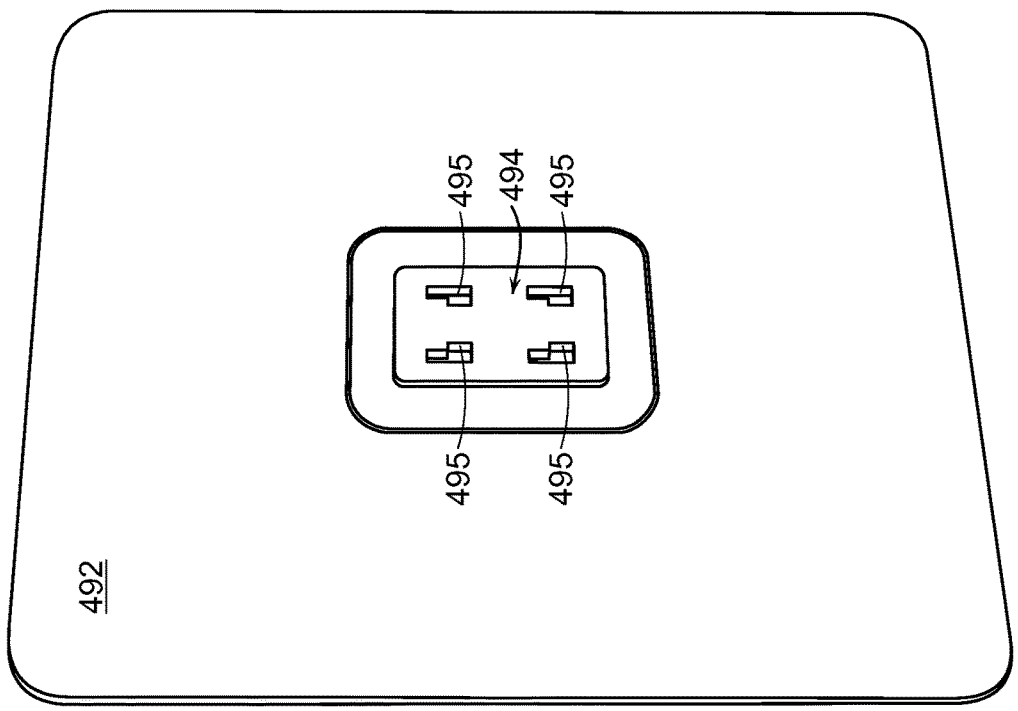
FIG. 29 is a rear perspective view of the mirror.
Figure 28:
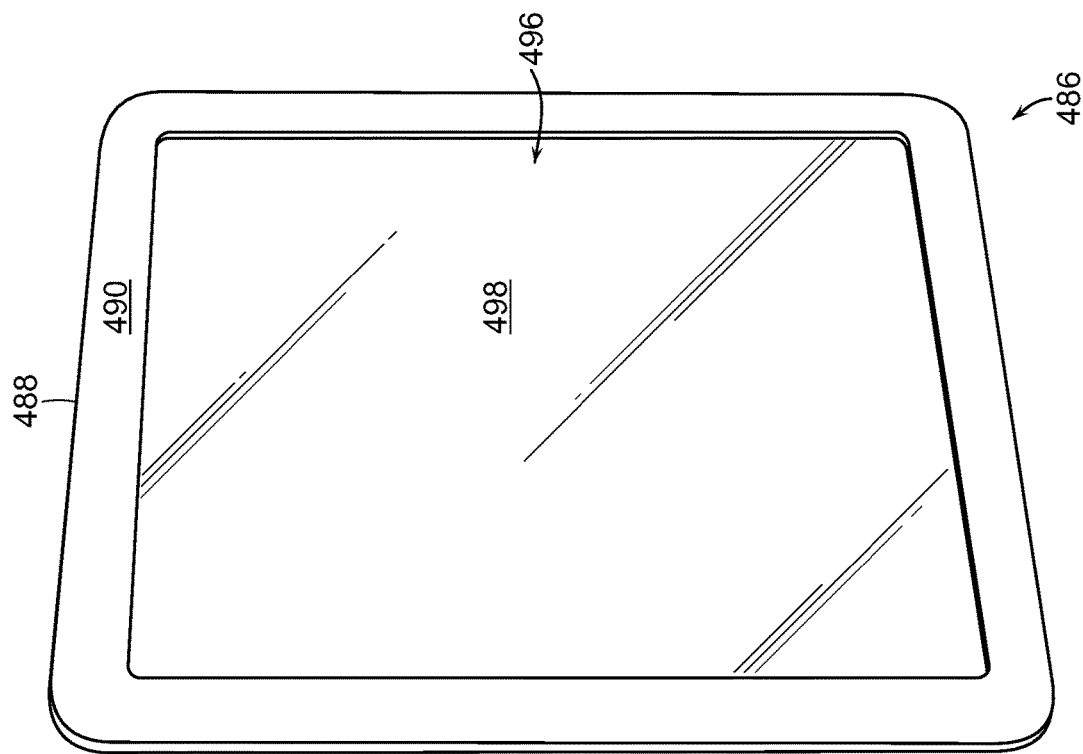
FIG. 28 is a front perspective view of the mirror.

Referring to FIGS. 28 and 29, mirror unit 468 comprises a housing 488 and a mirror 496 having a mirror surface 498. Housing 488 comprises a front portion 490 having a cavity (not shown) to secure mirror 496 by conventional means such as adhesive. Housing 488 further comprises a rear portion 492 and a female connector 494 centrally disposed and formed as part of rear portion 492. As is well known in the art, female connector 494 comprises a plurality of slots 495 adapted to removably receive and secure protrusions 469 of male connector 478 so that mirror unit 468 may be removably and adjustably engaged with upper end 466 of central flexible arm 462 of light unit 422.

Figure 30:
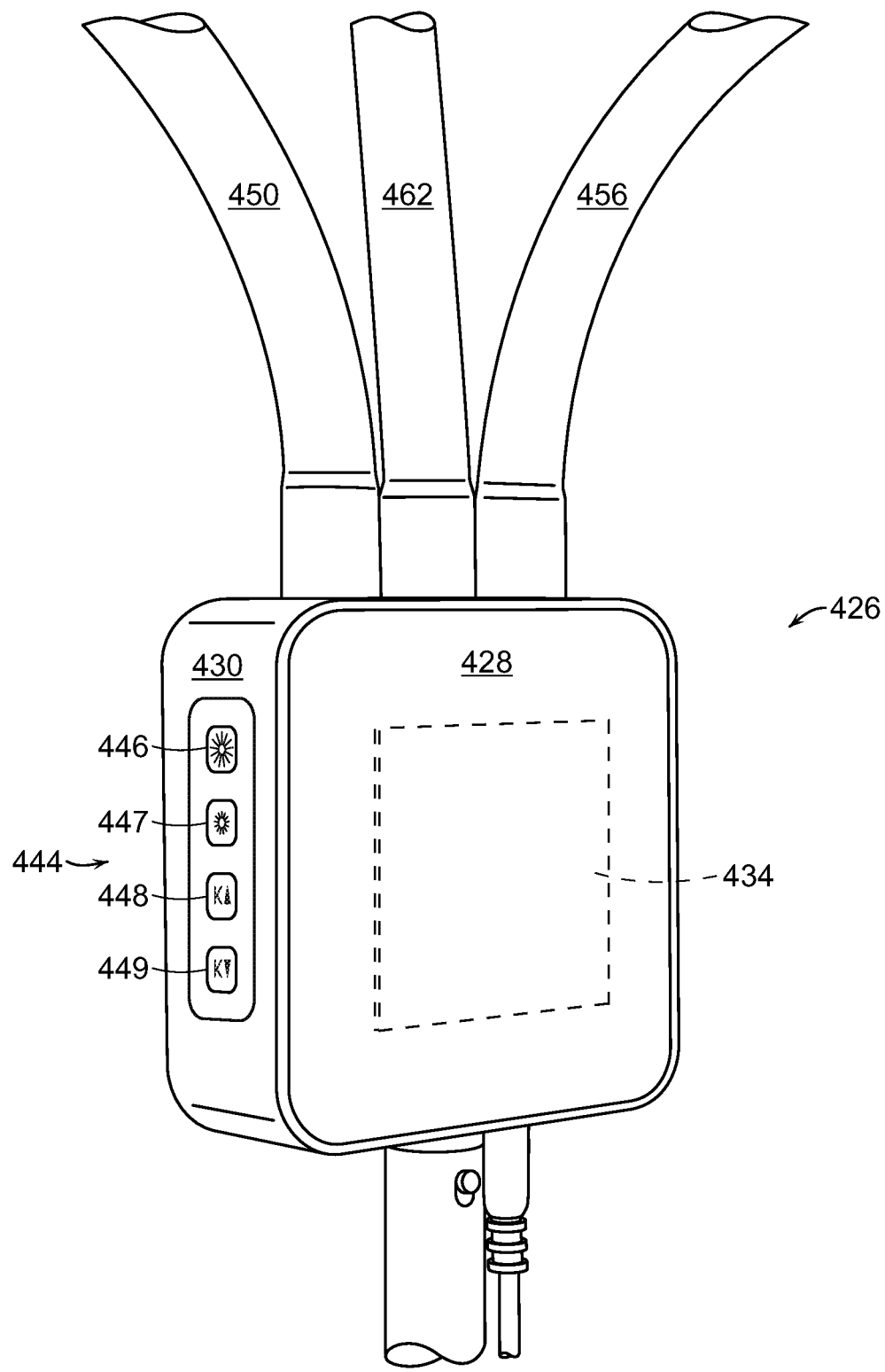
FIG. 30 is a perspective view of the control unit.
Figure 31:
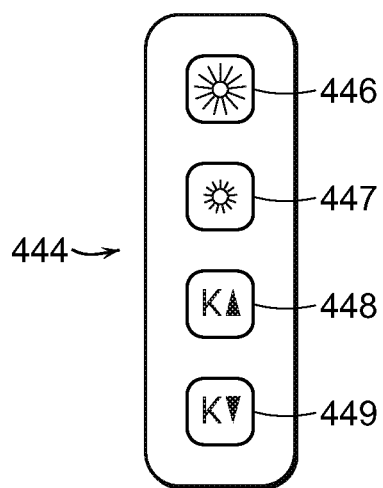
FIG. 31 is a front view of a membrane switch.

Referring to FIGS. 30 and 31, control unit 426 comprises a housing 428 and an input device 444 mounted to a sidewall 430 of housing 428. Input device 444 is a membrane switch comprising buttons 446 and 447 to dim up and dim down, respectively, the intensity of light sources 470 and 478. Holding down of buttons 446 or 447 turns on or turns off light sources 470 and 478. Input device 444 further comprises buttons 448 and 449 to increase or decrease, respectively, the temperature of light sources 470 and 478. Control unit 426 further comprises a control circuit 432 (not shown) assembled on a printed circuit board 434 by conventional means that is electrically connected with input device 444 and light sources 470 and 478. As will be more fully described herein, control circuit 432 comprises a communication chip 438, such as Bluetooth®, that can be activated by remote control 500 (FIG. 32) to send a wireless signal to the communication chip of communication device 50 to activate camera 52 to take a picture or video. Control circuit 432 further comprises circuitry to receive a wireless signal from remote control 500 to dim up or dim down the intensity of light sources 470 and 478 and/or the temperature of light sources 470 and 478.

Figure 32:
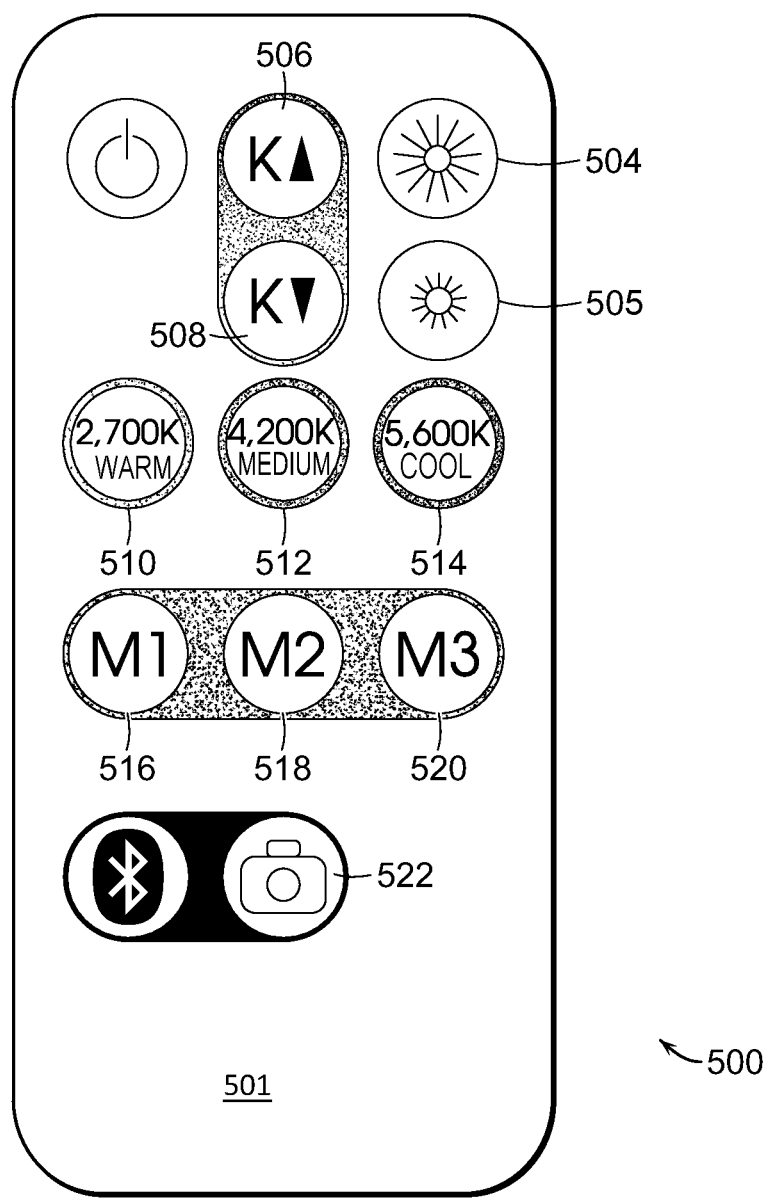
FIG. 32 is a top view of the remote control unit.

Referring to FIG. 32, remote control 500 comprises a housing 501 and a dim up LED button 504, which when activated, sends a signal to control circuit 432 to increase the intensity of light sources 470 and 478. Remote control 500 comprises a dim down LED button 505, which when activated, sends a signal to control circuit 432 to decrease the intensity of light sources 470 and 478. Remote control 500 comprises a increase LED temperature button 506, which when activated, sends a RF signal to control circuit 432 to increase the temperature of light sources 470 and 478. Remote control 500 comprises a decrease LED temperature button 508, which when activated, sends a signal to control circuit 432 to decrease the temperature of light sources 470 and 478. Remote control 500 further comprises a fixed warm temperature button 510, which when activated, sends a signal to control circuit 432 to set the temperature of light sources 470 and 478 to a full warm temperature of about 2700K. Remote control 500 further comprises a fixed medium temperature button 512, which when activated, sends a signal to control circuit 432 to set the temperature of light sources 470 and 478 to a medium temperature of about 4200K. Remote control 500 further comprises a fixed cool temperature button 514, which when activated, sends a signal to control circuit 432 to set the temperature of light sources 470 and 478 to a full cool temperature of about 5600K. Remote control 500 further comprises a first memory button 516, which when activated, will send a signal to control circuit 432 to set the intensity and temperature of light sources 470 and 478 to a pre-stored level. Remote control 500 further comprises a second memory button 518, which when activated, will send a signal to control circuit 432 to set the intensity and temperature of light sources 470 and 478 to a pre-stored level. Remote control 500 further comprises a third memory button 520, which when activated, will send a signal to control circuit 432 to set the intensity and temperature of light sources 470 and 478 to a pre-stored level. Remote control 500 further comprises a camera activation button 522, which when activated, sends a signal to control circuit 432 to send a wireless signal to the communication chip of communication device 50 to activate camera 52 to take a picture or video. Remote control 500 is an infra red (IR) type remote control that comprises an IR transmitter 502 (FIG. 33) and a light emitting diode (not shown). Remote control 500 is commonly known and widely available with multiple channels or custom designed. Remote control 500 may be any other type of remote control such as a radio frequency (RF) type remote control or any futurely developed technology.

Figure 33:
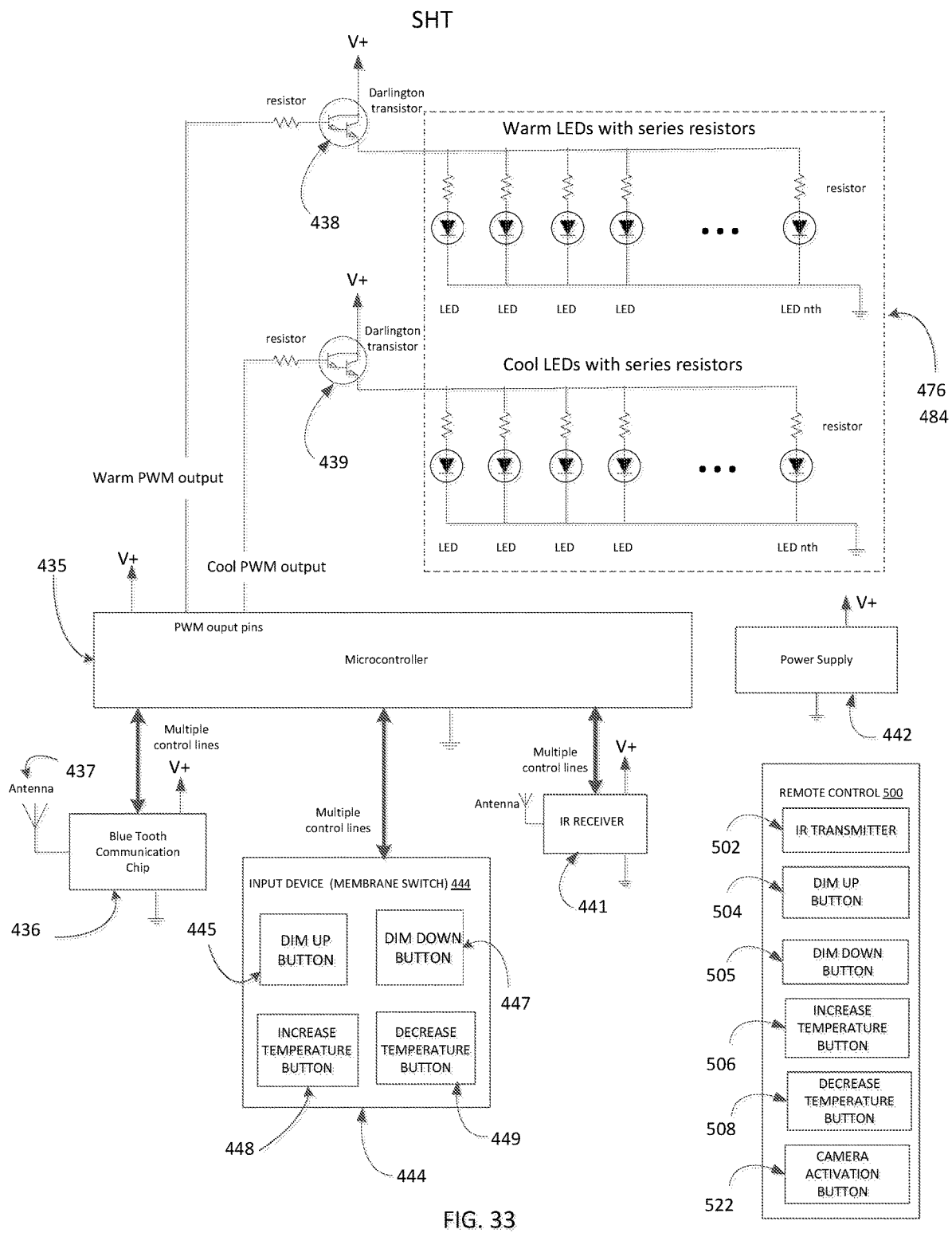
FIG. 33 is a high level schematic of the electro-mechanical and electrical components of the light stand.

Referring to FIG. 33, where a high level block diagram shows input device 444, control circuit 432, light emitting diodes 476 and 477 of light sources 470 and 478, and a power supply 442. Control circuit 432 generally comprises a microcontroller 435 electrically connected with a wireless communication chip 436 and an antenna 437 by a printed circuit board 434 (FIG. 30). Microcontroller 435 is electrically connected with input device 444 and power supply 442 by conventional wiring and board mounted connectors. Microcontroller 435 is electrically connected with light emitting diodes 477 and 478 of light sources 470 and 478 by transistors 438 and 439 to control the intensity and/or temperature of light sources 470 and 478 by pulse width modulation based upon signals from input device 444. Control circuit 442 further comprises a IR receiver 441 electrically connected with microcontroller 435. IR receiver 441 sends signals to microcontroller 435 corresponding to wireless signals received by IR receiver 441 from remote control 500 to control the intensity and/or temperature of light sources 470 and 478 by pulse width modulation. Microcontroller 435 comprises a memory system (not shown) and a software module (not shown) stored on the memory system. Microcontroller 435 may be an Arduino Uno Rev3 type controller manufactured by Arduino Corporation (www.arduino.cc/en) and available online as Part No. 50 from Adafruit Industries, Inc., 150 Varick Street, New York, N.Y. 10013 (http://www.adafruit.com) which may be programmed with software module. Microcontroller 435 may be any type of presently and/or futurely developed electronic circuitry and/or discrete circuitry. The software module can be easily written in software or code based upon the desired functionality of the various buttons of input device 444 (FIG. 31) and remote control 500 (FIG. 32). The software module comprises software or code configured to instruct microcontroller 435 to send control signals to transistors 438 and 439 to control the intensity and/or temperature of light emitting diodes 476 and 477 of light sources 470 and 478 based upon signals received from input device 444, namely, by activation of dim up LED button 446, dim down LED button 447, increase LED temperature button 448, or decrease LED temperature button 449. The software module comprises software or code configured to instruct microcontroller 435 to send control signals to transistors 438 and 439 to control the intensity and/or temperature of light emitting diodes 476 and 477 of light sources 470 and 478 based upon signals received from remote control 550 via IR receiver 441, by activation of dim up LED button 504, dim down LED button 505, increase LED temperature button 506, increase LED temperature button 508, fixed full cool temperature button 510, fixed medium temperature button 512, fixed full warm temperature button 514, memory button 516, memory button 518 or memory button 520. The software module further comprises software or code configured to instruct microcontroller 435 to send a control signal to wireless communication chip 437 to activate camera 52 of communication device 50 based upon a signal received from remote control 550 via RF receiver 441 by activation of camera activation button 522. Microcontroller 435 may be programmed or implemented in C/C++ programming language. Power supply 442 may be any type of power supply capable of providing suitable power to the various electrical components. Power supply 442 is connected to an AC power source (not shown) such as an electrical wall outlet.

Figure 34:
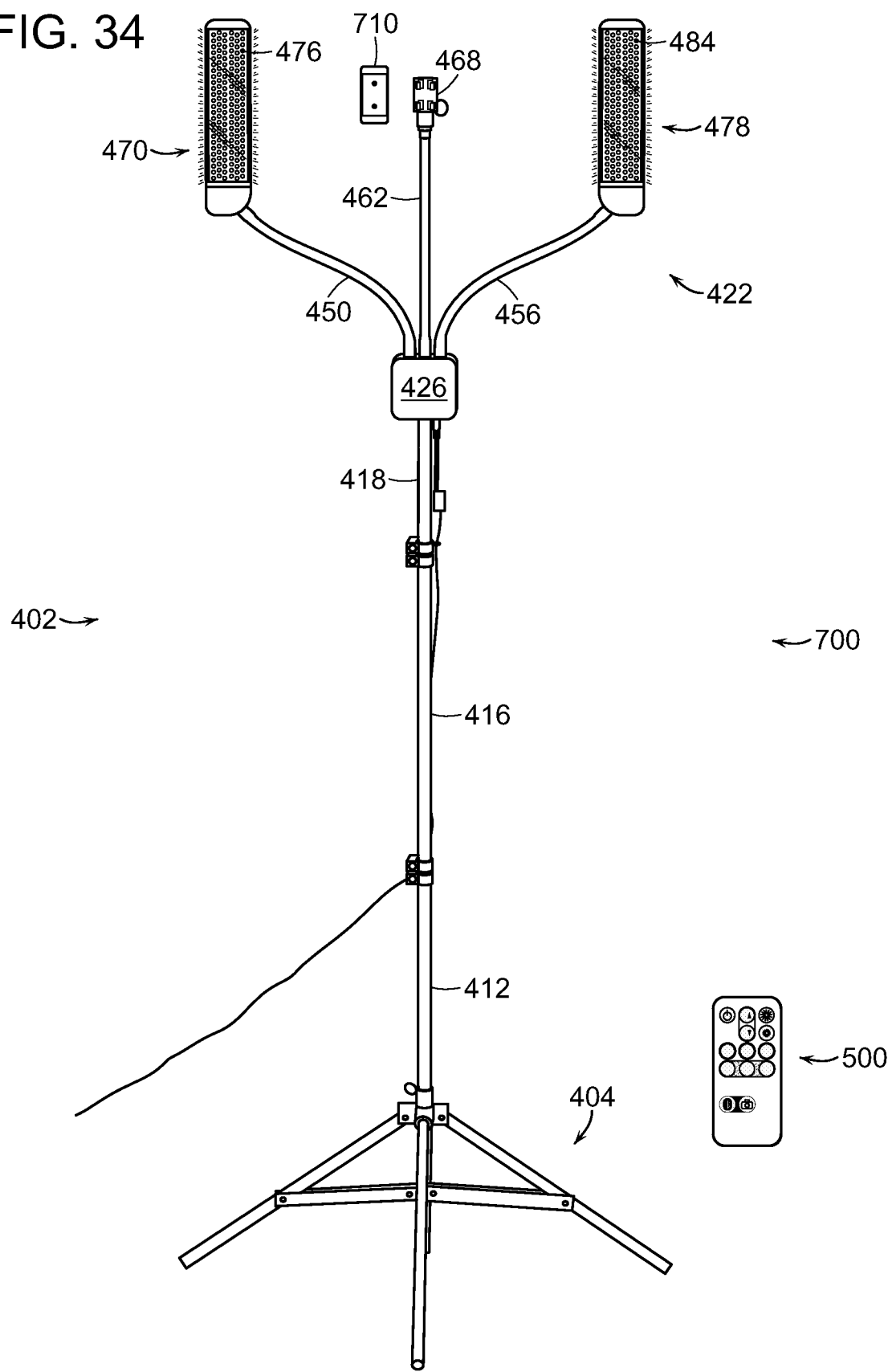
FIG. 34 a perspective view of a light stand according to the present invention showing a light unit secured to a base unit, a fastener removably engaged a central flexible arm of the light unit to support an electronic communication device, such as an IPhone®, in a landscape orientation, and a remote control unit to control taking of a selfie picture or video.
Figure 35:
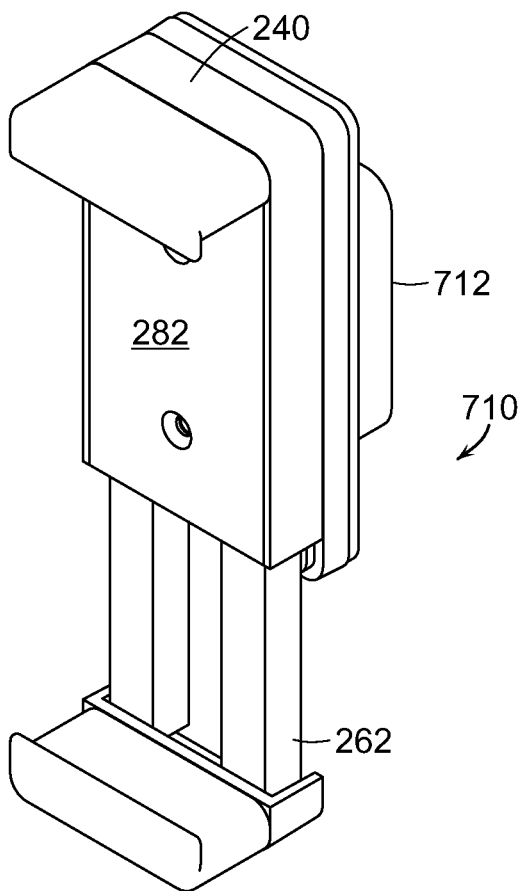
FIG. 35 is a top perspective view of a fastener that engages with a male connector of the central flexible arm of the light unit.
Figure 36:
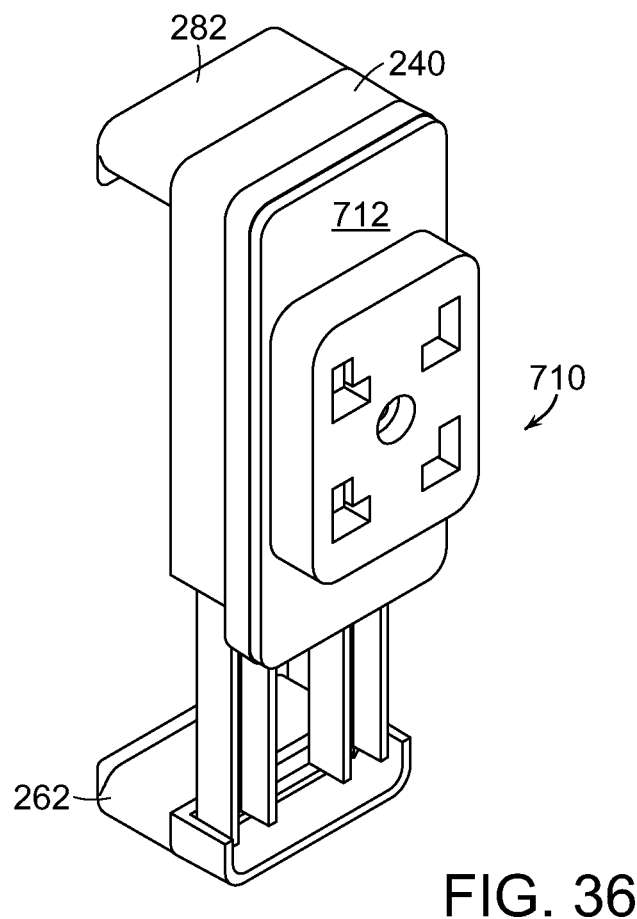
FIG. 36 is a bottom perspective view the fastener showing a base having a female connector for engagement with a male connector of the central flexible arm of the light unit.
Figure 37:
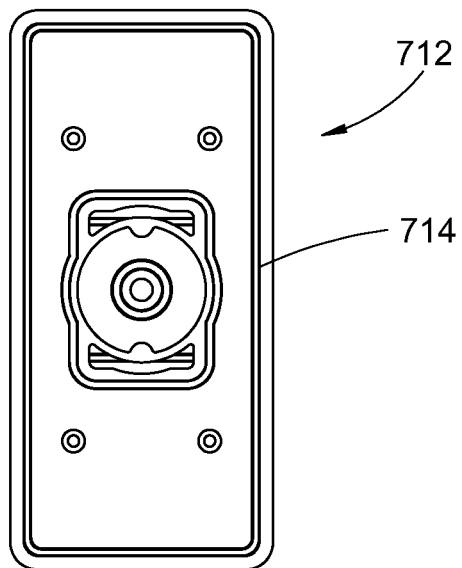
FIG. 37 is a top view of the base.
Figure 38:
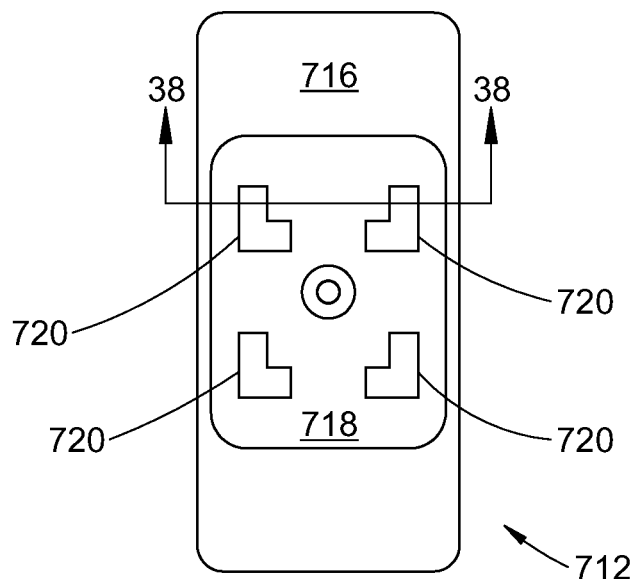
FIG. 38 is a bottom view of the base.
Figure 39:
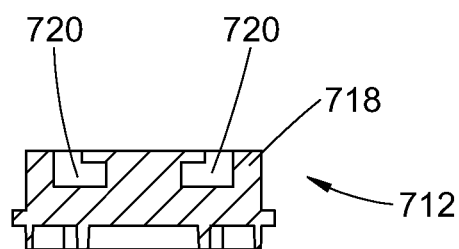
FIG. 39 is a cross-section view taken along line 38-38 of FIG. 37.

Referring to FIG. 34, where a perspective view of a light stand 700 according to the present invention shows light unit 422 (previously described) secured to tri-pod stand 402 (previously described), a fastener 710 removably engaged with central flexible arm 462 of light unit 422 to support electronic communication device 50 in a landscape orientation, and remote control 500 (previously described) to control taking of a selfie picture or video. Except for fastener 710, light stand 700 is the same as light stand 400 as described heretofore.

Referring to FIGS. 35-39, fastener 710 comprises a base 712, carrier housing 240 (previously described), moveable arm 262 (previously described), and fixed arm 282 (previously described). Fastener 710 is identical to fastener 208 (previously described) except for base 210 (FIGS. 14-16) that has been replaced with base 712. Base 712 comprises a top portion 714 and a bottom portion 716. Top portion 714 of base 712 is identical to front portion 222 of fastener 208 (FIG. 16). Bottom portion 716 comprises a female connector 718 having a plurality of slots 720 that removably engage with protrusions 469 of male connector 468 (FIG. 27) of central flexible arm 462. Base 712 is made of plastic and may be fabricated by conventional molding processes.

In alternative embodiments, a larger size or full body mirror having a mirror surface may be employed with a plurality of magnets so the fastener 208 may be positioned at different locations or heights about the mirror surface. For example, an apparatus may comprises a full body mirror comprising a mirror surface, and fastener 208 engaged with the full body mirror and the electronic communication device to position the camera in front of the mirror surface to take a selfie picture or video. The full body mirror comprises a plurality of magnets defining lower, middle, and upper fastening areas. Fastener 208 is removably engaged with the lower, middle or upper fastening area allowing a person to adjust the height of the camera. As in other embodiments, the apparatus may comprise a control circuit and an input device connected with the control circuit to activate the camera to take a selfi picture of video.

The foregoing description is intended primarily for purposes of illustration. This invention may be embodied in other forms or carried out in other ways without departing from the spirit or scope of the invention. Modifications and variations still falling within the spirit or scope of the invention will be readily apparent to those of skill in the art.

What is claimed:

1. An apparatus for use with an electronic communication device having a camera to take a selfie picture or video comprising:
   a tri-pod stand comprising first, second, and third legs; said tri-pod stand further comprises a lower support pole removably engaged with an upper support pole;
   a control unit removably engaged with said upper support pole;
   a first flexible arm engaged with and extending upward from said control unit;
   a second flexible arm engaged with and extending upward from said control unit; a third flexible arm engaged with and extending upward from said control unit; said third flexible arm being disposed between said first flexible arm and said second flexible arm;
   a first light source engaged with said first flexible arm;
   a second light source engaged with said second flexible arm;
   a fastener engaged with said third flexible arm; said fastener being removably and rotatably engaged with the communication device to position the camera between a portrait view and a landscape view;
   said control unit being adapted to send a first signal to the communication device to activate said first light source and a second signal to activate the camera of the communication device; and
   a remote control device adapted to send a signal to said control unit causing said control unit to send said second signal to the communication device to activate the camera and take a picture.

2. The apparatus of claim 1, wherein said control unit comprises a housing; said first flexible arm being engaged with said housing; said second flexible arm being engaged with said housing; and said third flexible arm being engaged with said housing.

3. The apparatus of claim 2, wherein said control unit further comprises a microcontroller and a wireless communication chip electrically connected with said microcontroller so said control unit can send said second signal to the communication device to activate the camera upon receipt of said signal from said remote control.

4. The apparatus of claim 3, wherein said control unit further comprises an input device engaged with said housing and electrically connected with said microcontroller.

5. The apparatus of claim 4, wherein said fastener comprises a base removably engaged with said third flexible arm and a carrier housing rotatably engaged with said base to position the camera of communication device between a portrait orientation and a landscape orientation.

6. The apparatus of claim 5, wherein said fastener further comprises a fixed arm engaged with carrier housing and a moveable arm moveably engaged with said fixed arm for retaining the communication device.

7. The apparatus of claim 1, wherein said remote control is an infrared (IR) type remote control comprising an IR transmitter.

8. The apparatus of claim 1, wherein each of said first and second light sources comprise light emitting diodes.

* * * * *